(12) United States Patent
Roy et al.

(10) Patent No.: US 11,418,464 B2
(45) Date of Patent: *Aug. 16, 2022

(54) SYSTEM AND METHOD FOR PROCESSING MESSAGES BETWEEN ORGANIZATIONS

(71) Applicant: Global Relay Communications Inc., Vancouver (CA)

(72) Inventors: Warren Roy, Vancouver (CA); Peter MacDONALD, Vancouver (CA); Alfred Scholldorf, New York, NY (US); Philip Persad, Vancouver (CA)

(73) Assignee: Global Relay Communications Inc., Vancouver (CA)

(*) Notice: Subject to any disclaimer, the term of this patent is extended or adjusted under 35 U.S.C. 154(b) by 17 days.

This patent is subject to a terminal disclaimer.

(21) Appl. No.: 16/909,883

(22) Filed: Jun. 23, 2020

(65) Prior Publication Data

US 2020/0322292 A1 Oct. 8, 2020

Related U.S. Application Data

(63) Continuation of application No. 15/946,317, filed on Apr. 5, 2018, now Pat. No. 10,728,187.

(51) Int. Cl.
*H04L 51/04* (2022.01)
*H04L 67/306* (2022.01)
*H04L 51/56* (2022.01)

(52) U.S. Cl.
CPC .............. *H04L 51/04* (2013.01); *H04L 51/36* (2013.01); *H04L 67/306* (2013.01)

(58) Field of Classification Search
CPC ........ H04L 51/04; H04L 51/36; H04L 67/306
See application file for complete search history.

(56) References Cited

U.S. PATENT DOCUMENTS

| 8,180,029 | B2 | 5/2012 | Katis et al. |
| 8,738,715 | B2 | 5/2014 | Roy et al. |
| 9,396,351 | B2 | 7/2016 | Lim |
| 10,728,187 | B2* | 7/2020 | Roy ........................ H04L 51/04 |
| 2005/0273510 | A1* | 12/2005 | Schuh ................. H04L 12/1813 709/204 |

(Continued)

*Primary Examiner* — Jeong S Park
(74) *Attorney, Agent, or Firm* — Gardiner Roberts LLP

(57) ABSTRACT

A system and method of managing electronic messaging accounts for an organization is provided. The method comprises executing instructions on a processor at a server that: for a first user account for a first user associated to the organization, define a message space accessible through electronic devices in communication with the server. The message space accommodates peer-to-peer administration by users in the organization. The message space also provides facilities for: identifying an owner for the message space; assigning owner privileges for the owner; selectively identifying the first user account as the owner for the message space; and creating a message channel in the message space for messages between users in the organization and users in a second organization. In the method, the owner privileges follow an organization policy for the organization and provide the first user with additional privileges in managing the message space reflecting the organization policy.

20 Claims, 27 Drawing Sheets

(56) References Cited

U.S. PATENT DOCUMENTS

| | | | |
|---|---|---|---|
| 2008/0034040 A1* | 2/2008 | Wherry | G06Q 10/107 |
| | | | 709/204 |
| 2009/0003247 A1 | 1/2009 | Katis | |
| 2010/0023491 A1 | 1/2010 | Huang | |
| 2010/0241700 A1 | 9/2010 | Rasmussen | |
| 2012/0317208 A1* | 12/2012 | Sousa | H04L 51/00 |
| | | | 709/206 |
| 2013/0198296 A1* | 8/2013 | Roy | G06Q 10/107 |
| | | | 709/206 |
| 2014/0310365 A1* | 10/2014 | Sample | H04L 51/16 |
| | | | 709/206 |
| 2015/0244684 A1* | 8/2015 | Ng | H04L 63/0428 |
| | | | 713/168 |
| 2015/0350250 A1* | 12/2015 | Brander | H04L 63/061 |
| | | | 726/1 |
| 2016/0050177 A1 | 2/2016 | Cue | |
| 2016/0267533 A1 | 9/2016 | Seth | |
| 2016/0307286 A1* | 10/2016 | Miasnik | G06Q 50/265 |
| 2016/0315941 A1 | 10/2016 | Dang | |
| 2018/0047123 A1* | 2/2018 | Miasnik | G06Q 10/00 |

* cited by examiner

300

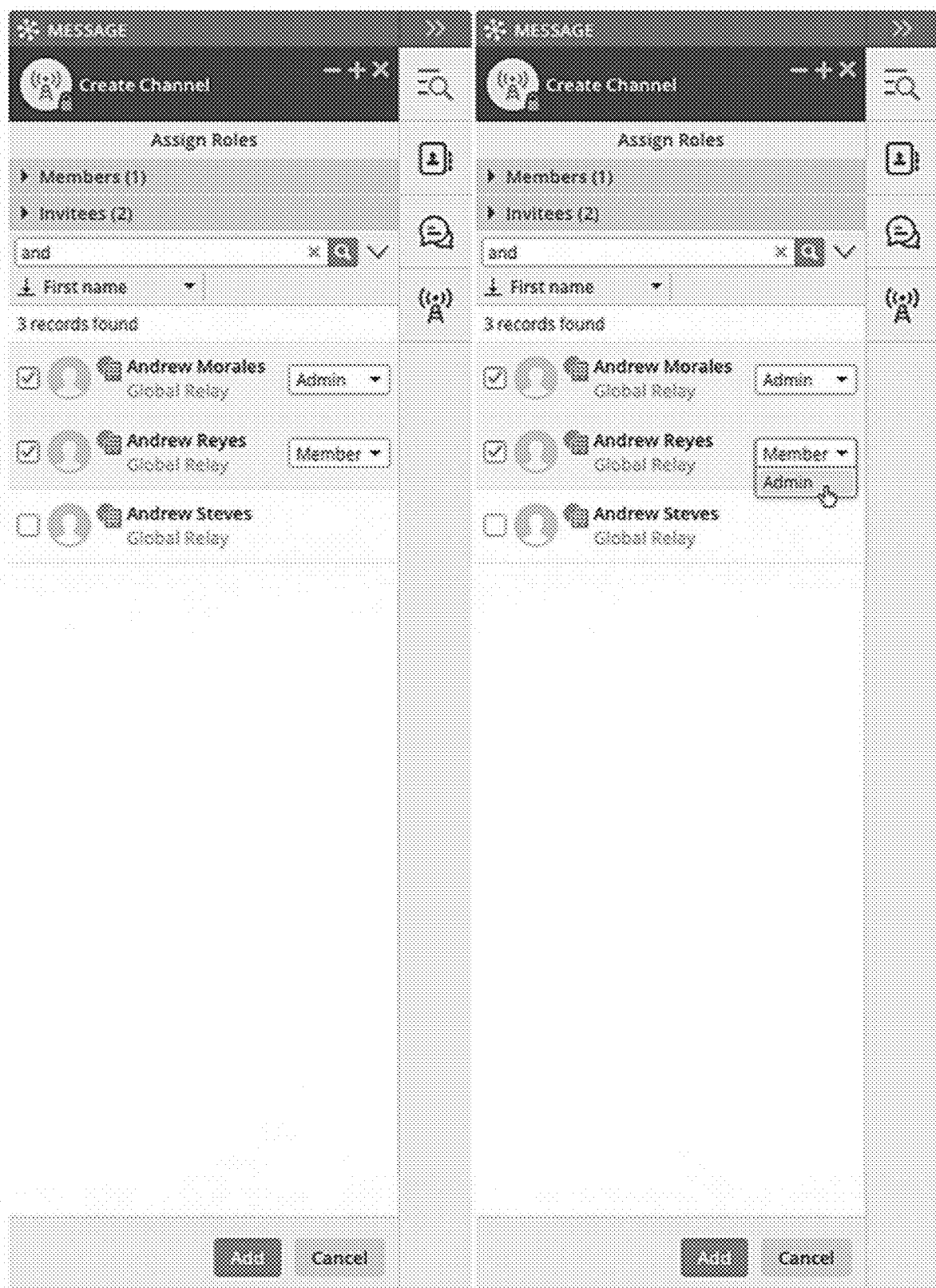
1800b     Fig. 18b

SYSTEM AND METHOD FOR PROCESSING MESSAGES BETWEEN ORGANIZATIONS

RELATED APPLICATION

This application is a continuation application of U.S. patent application Ser. No. 15/946,317 filed on Apr. 5, 2018 (now U.S. Pat. No. 10,728,187).

FIELD OF THE DISCLOSURE

The present disclosure relates to the field of electronic messaging systems and methods of processing and archiving electronic messages. In particular, the disclosure relates to systems and methods for processing electronic messages with controls for messages on behalf of organizations and personal messages.

DESCRIPTION OF THE BACKGROUND

Prior art electronic messaging platforms provide virtual interaction spaces where users may both post content and view content from others over an extended period of time. Individuals that subscribe to various electronic messaging systems use often use such messaging systems for personal and work-related matters.

When a user on a typical prior art platform creates and posts electronic messages as a representative of an organization (e.g. an employee of a company) to a community in the platform, often policy rules and regulations are applicable that need to be followed in managing the postings. For example, the organization may have a policy that restricts participation of the individual in a specific forum on that platform.

Additionally, there may be regulatory obligations applicable to the organization to properly manage and store such postings. For example, in the financial services industry, several jurisdictions have imposed rules and regulations governing management and storage of electronic communications. For example, in the United States, its Securities and Exchange Commission (SEC) Rules 17a-3 and 17a-4 require preservation and retention of all business-related electronic correspondence. In the European Union (EU), the General Data Protection Regulation (GDPR) imposes standards governing privacy rights of EU citizens over personal data held and processed by companies providing electronic services. In the health services industry, in the United States, the Health Insurance Portability and Accountability Act (HIPAA) and the Health Information Technology Act (HITA) impose restrictions on use and disclosure of protected health information and mandate privacy and security obligations on electronic health information.

Current messaging systems do not effectively handle such restrictions, especially in view of public and private electronic postings created by individuals. There is a need to address deficiencies in the prior art.

SUMMARY OF THE DISCLOSURE

In a first aspect, a method for managing electronic messaging accounts for an organization of a plurality of organizations is provided. The method comprises executing instructions on a processor at a server that: for a first user account for a first user associated to the organization, define a message space accessible through electronic devices in communication with the server. The message space accommodates peer-to-peer administration by users in the organization. The message space also provides facilities for: identifying an owner for the message space; assigning owner privileges for the owner; selectively identifying the first user account as the owner for the message space; and creating a message channel in the message space for messages between users in the organization and users in a second organization. In the method, the owner privileges follow an organization policy for the organization and provide the first user with additional privileges in managing the message space reflecting the organization policy.

The method may further comprise storing data relating to the message space, the owner and the owner privileges in a memory storage device accessible by the processor.

For the method, the processor may further execute instructions that, if the owner has not been assigned to a message channel in the message space, then upon receiving a request from the first user to be recognized as the owner, identify the first user to be the owner if no other user has submitted an earlier active request to be recognized as the owner.

For the method, the processor may further execute instructions that: identify when the first user has vacated as being the owner of the message channel; and upon receiving a request from the second user to be recognized as the owner, assign the owner privileges to the second user if the second user has an appropriate entitlement setting its privileges, and no other user has submitted an earlier active request to be recognized as the owner. For the method, the processor may further execute instructions that process database search requests for owners assigned to the message channel.

For the method, the processor may further execute instructions that send a notification message to the second user when there is no owner assigned to the message channel.

For the method, a second message space may be associated with the organization and an entity in a second organization. As well, the method may further comprise executing instructions on the processor at the server that provide access to a message channel in the message space for messages between users in the organization and users in a second organization. For the method, the second message space may be accessible through an electronic device; the second message space may provide electronic conversations regulated on a peer-to-peer basis between the first user and the entity; and the second message space may have a second set of access privileges following a second organization policy for the second organization.

For the method, entitlement to use the second message space by the first user may be established by the organization; and use of the second message space by the first user may indicate that communications from the first user have been authorized on behalf the organization.

For the method, the processor may further execute instructions that process inputs accepted through a user interface to control and grant entitlements to the first user enabling the first user to make decisions for the message space for the organization.

The method may further comprise executing instructions on the processor that manage data relating to a message directory providing a searchable database comprising the organization and first user.

The method may further comprise executing instructions on the processor that: provide a second message space accessible through the electronic devices, the second message space providing facilities for creating a second message for the first user in a second account for processing by the second message space providing private electronic conversations; and receive an access request to the message space. Further, if the access request is a first access to the message space, the method may federate the first account to the second account by aggregating profile attributes of the first and second accounts into a single user profile for the first user, and record the federation in an account link. For the method, the first user account may have a first set of access privileges associated with the message space; the second user account may have a second set of access privileges associated with the second message space for private messages; the second set of access privileges may be maintained independently to the first set of access privileges; and the second message space may provide private messages that are not regulated by the message space.

For the method, federating may be established when the first user launches the message space on behalf of the organization to be used for the exchange of messages with a second organization.

For the method, upon receiving a request to leave the message space, the method may further comprise executing instructions on the processor that: deactivate the first user account; dissolve the account link in the federated account; and retain contact information in the second user account in the federated account.

In another aspect, a server for managing electronic messaging accounts associated with an organization of a plurality of organizations is provided. The server comprises: a memory storage device; a communication link to an electronic device; and a processor. The processor executes instructions from the memory storage device that: for a first user account for a first user associated the organization, define a message space accessible through electronic devices, where the message space accommodates peer-to-peer administration by users in the organization. The message space provides facilities for identifying an owner for the message space; assigning owner privileges for the owner; selectively identifying the first user account as the owner for the message space; and creating a message channel in the message space for messages between users in the organization and users in a second organization. In the message space, the owner privileges follow an organization policy for the organization and provide the first user with additional privileges in managing the message space reflecting the organization policy.

In the server, the processor may execute further instructions from the memory storage device that if the owner has not been assigned to the message space, then upon receiving a request from the first user to be recognized as the owner, then identifying the first user to be the owner if no other user has submitted an earlier active request to be recognized as the owner.

For the server, the processor may execute further instructions from the memory storage device that: identify when the first user has vacated as being the owner; and upon receiving a request from the second user to be recognized as the owner, assign the owner privileges to the second user if the second user has an appropriate entitlement setting its privileges, and no other user has submitted an earlier active request to be recognized as the owner.

For the server, the processor may execute further instructions from the memory storage device that manage data relating to a message directory providing a searchable database comprising the organization and first user.

For the server, entitlement to use the second message space by the first user may be established by the organization; and use of the second message space by the first user may indicate that communications from the first user have been authorized on behalf the organization.

For the server, the processor may execute further instructions from the memory storage device that provide a second message space accessible through the electronic devices, where the second message space provides facilities for creating a second message for the first user in a second account for processing by the second message space providing private electronic conversations; and receive an access request to the message space and if the access request is a first access to the message space, then federate the first account to the second account by aggregating profile attributes of the first and second accounts into a single user profile for the first user, and record the federation in an account link. For the message space, the first user account has a first set of access privileges associated with the message space; the second user account has a second set of access privileges associated with the second message space for private messages; the second set of access privileges are maintained independently to the first set of access privileges; and the second message space provides private messages that are not regulated by the message space.

For the server federating may be established when the first user launches the message space on behalf of the organization to be used for the exchange of messages with a second organization.

For the server, the processor may execute further instructions from the memory storage device that deactivate the first user account; dissolve the account link in the federated account; and retain contact information in the second user account in the federated account.

In another aspect, a method for managing electronic messaging accounts for an organization of a plurality of organizations is provided, where administration of a message space for the accounts is provided on a peer-to-peer basis among the accounts. The method comprises executing instructions on a processor at a server that: store data on a memory storage device relating to the message space, an owner among the accounts for the message space, and owner privileges for the owner; upon receiving a request from a first user in a first account in the accounts to be recognized as the owner, update data relating to the ownership privileges to identify the first user to be the owner if no other user has submitted an earlier active request to be recognized as the owner; identify when the first user has vacated as being the owner of the message channel; and upon receiving a request from a second user to be recognized as the owner, update data relating to the ownership privileges by assigning the owner privileges to the second user if the second user has an appropriate entitlement setting its privileges, and no other user has submitted an earlier active request to be recognized as the owner. For the organization, the owner privileges follow an organization policy for the organization and provide the first user with additional privileges in managing the message space reflecting the organization policy.

In another aspect of an embodiment for this disclosure, a method for managing electronic messaging accounts for a user having a first user account for a first message space associated with a first entity and a second user account associated with a second message space is provided. The method comprises executing instructions on a processor at a server that: provide a first message service accessible through an electronic device in communication with the server, the first message service providing facilities for creating a first message for the first user account for processing by the first message space providing private electronic conversations; provide a second message service accessible through the electronic device, the second message service providing facilities for creating a second message for the second user account for processing by the second message space providing regulated electronic conversations; and receive an access request to the second message service and if the access request is a first access to the second message service, federate the second account to the first account and record the federation in an account link. In the method, the first user account has a first set of access privileges associated with the first message space; the second user account has a second set of access privileges associated with the second message space; and the access privileges to the first user account are maintained independently to the access privileges to the second access privileges.

The method may further comprise, upon receiving a request to leave the second message space, executing instructions on the processor that: deactivate the second user account; dissolve the account link in the federated account; and retain contact information in the first user account in the federated account.

The method may further comprise, upon receiving a subsequent request to access the first message space, executing instructions on the processors that authenticate the system message account before providing access to the first message service.

In the method, authentication may be provided via Security Assertion Markup Language single sign-on, permitting a single-sign-on experience for the user when accessing either the first or the second accounts.

In the method, an entitlement to use the second message service by the user may be established by an organization controlling the entitlement for the second message service; and use of the second message service by the user may indicate that communications from the user have been authorized on behalf the organization.

In the method, an entitlement to invite additional users to the second message service by the user may be established by the organization.

In the method, an entitlement to claim ownership of the second message service by the user may be established by the organization.

In the method, messages in the second message service may be archived following a regulatory requirement.

The method may further comprise, upon receiving the request to leave the second message space, executing instructions on the processor that change notifications and visibilities associated with the second user account for the second messaging space.

In another aspect, the method may comprise for the second message service, executing instructions on the processor to create a business channel for the second message service by accepting inputs through a user interface operating on a device remotely in communication with the processor to add an authorized member for an organization associated with the second message service.

The method may further comprise for the business channel, executing instructions on the processor to process inputs accepted through the user interface to define ownership rights for the organization for the user.

The method may further comprise for the business channel, executing instructions on the processor to process inputs accepted through the user interface to control and grant entitlements to the user to make decisions for the organization.

The method may further comprise for the business channel, executing instructions on the processor to selectively permit generate timestamp information about messages shown in the user interface.

In the method, federating the second account to the first account may aggregate profile attributes of the first and second accounts into a single user profile for the user.

In another aspect, a server for managing electronic messaging accounts for a user having a first user account for a first message space associated with a first entity and a second user account associated with a second message space is provided. The server comprises: a memory storage device; a communication link to an electronic device; and a processor executing instructions. The instructions include: providing a first message service accessible through the electronic device, the first message service providing facilities for creating a first message for the first user account for processing by the first message space providing private electronic conversations; providing a second message service accessible through the electronic device, the second message service providing facilities for creating a second message for the second user account for processing by the second message space providing regulated electronic conversations; and receiving an access request to the second message service and if the access request is a first access to the second message service, federating the second account to the first account and record the federation in an account link. For the server, the first user account has a first set of access privileges associated with the first message space; the second user account has a second set of access privileges associated with the second message space; and the access privileges to the first user account are maintained independently to the access privileges to the second access privileges.

For the server an entitlement to use the second message service by the user may be established by an organization controlling the entitlement for the second message service; and use of the second message service by the user indicates that communications from the user may be authorized on behalf the organization.

For the server, a second entitlement to invite additional users to the second message service by the user may be established by the organization.

For the server a second entitlement to claim ownership of the second message service by the user may be established by the organization.

For the server, messages in the second message service may be archived following a regulatory requirement.

For the server, upon receiving a request to leave the second message space, the processor may execute further instructions to: deactivate the second user account; dissolve the account link in the federated account; and retain contact information in the first user account in the federated account.

A server and/or a device may be provided to implement any aspects of the methods described.

In other aspects various combinations of sets and subsets of the above aspects are provided.

BRIEF DESCRIPTION OF THE DRAWINGS

Embodiments of the disclosure will now be described, by way of example only, with reference to the accompanying drawings, in which:

FIG. 18b is a schematic diagram illustrating exemplary user interface screens generated on a user's device when assigning roles in a company channel as processed by the message platform for an embodiment of FIG. 1;

DETAILED DESCRIPTION OF EMBODIMENTS

Figure 1:
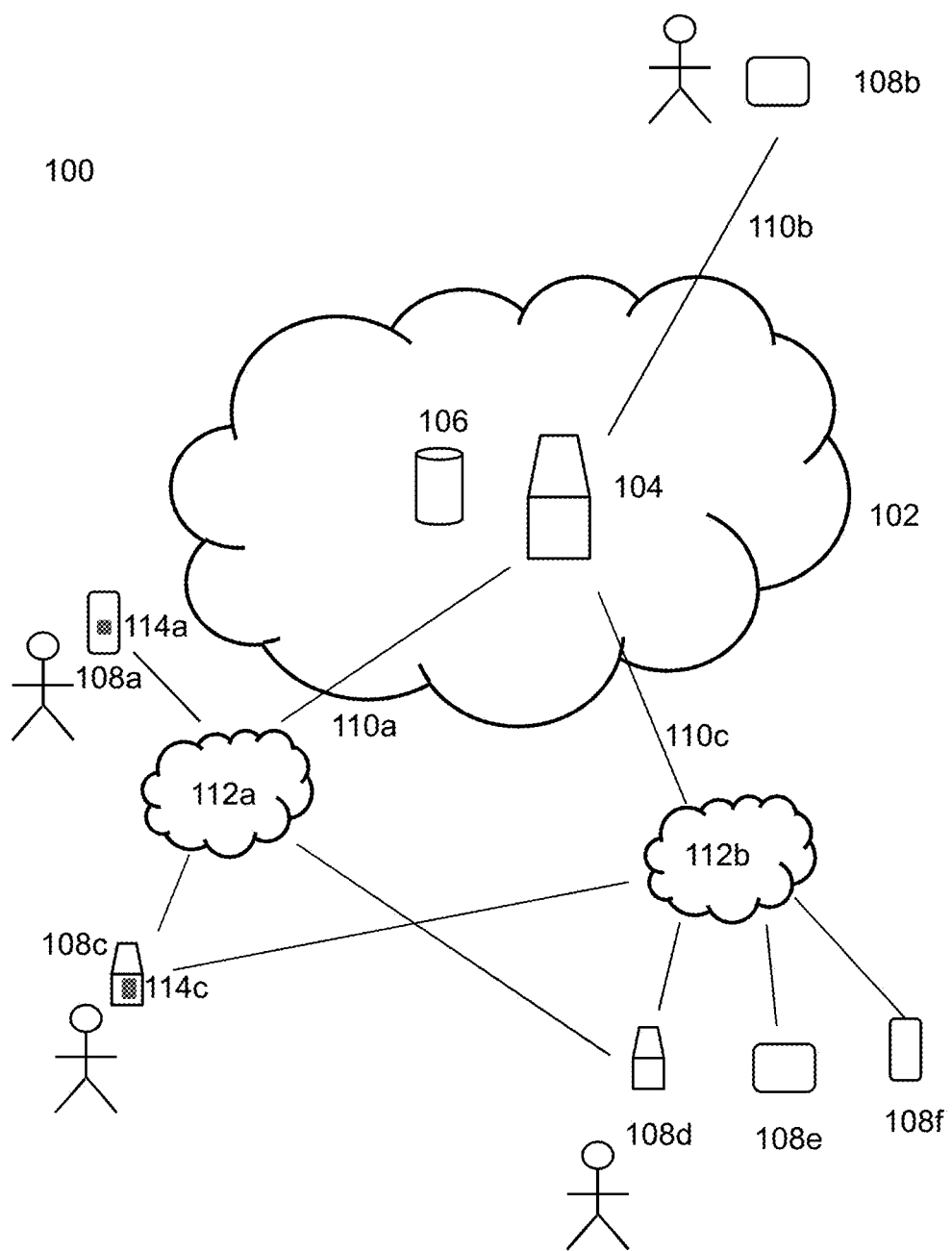
FIG. 1 is a schematic block diagram of an electronic message processing network having a message platform (as a server) and an archiving service accessed by devices (as clients) processing and archiving electronic messages and related postings and conversations among message accounts according to an embodiment.

Exemplary details of embodiments are provided herein. The description which follows and embodiments described therein are provided by way of illustration of an example or examples of particular embodiments of principles of the present disclosure. These examples are provided for the purposes of explanation and not limitation of those principles and of the disclosure. In the description which follows, like parts are marked throughout the specification and the drawings with the same respective reference numerals.

First, for context, structural components of an embodiment and its features are described in view of FIG. 1. An embodiment of the disclosed system and method is depicted in environment 100. At its core, system 102 has message platform 104 (as a message processing server) with database 106 that communicate with devices 108 through various communication links 110. Each device 108, may have installed thereon local client software 114, providing an application program interface (API) and a communication interface to system 102. Devices 108 include wireless mobile devices 108a, computing tablets 108b and computers/laptops 108c. Communication links 110 may be wireless or wired. A user of exemplary device 108 has one or more message accounts managed by platform 104. Sets of message accounts may be associated with specific entities or organizations 112 (e.g. individual companies). A user account may have associations with multiple organizations 112. Messages processed by platform 104 are electronic messages. Various formats and transmission protocols may be used for communicating the messages, such as forms akin to email messages, text messages, and others known in the art. For an embodiment, messages are tracked and processed in a format resembling text message streams, where message conversations are generated on a sender's (and recipient's) device(s) 108 as individual messages are added to a particular conversation.

Figure 2:
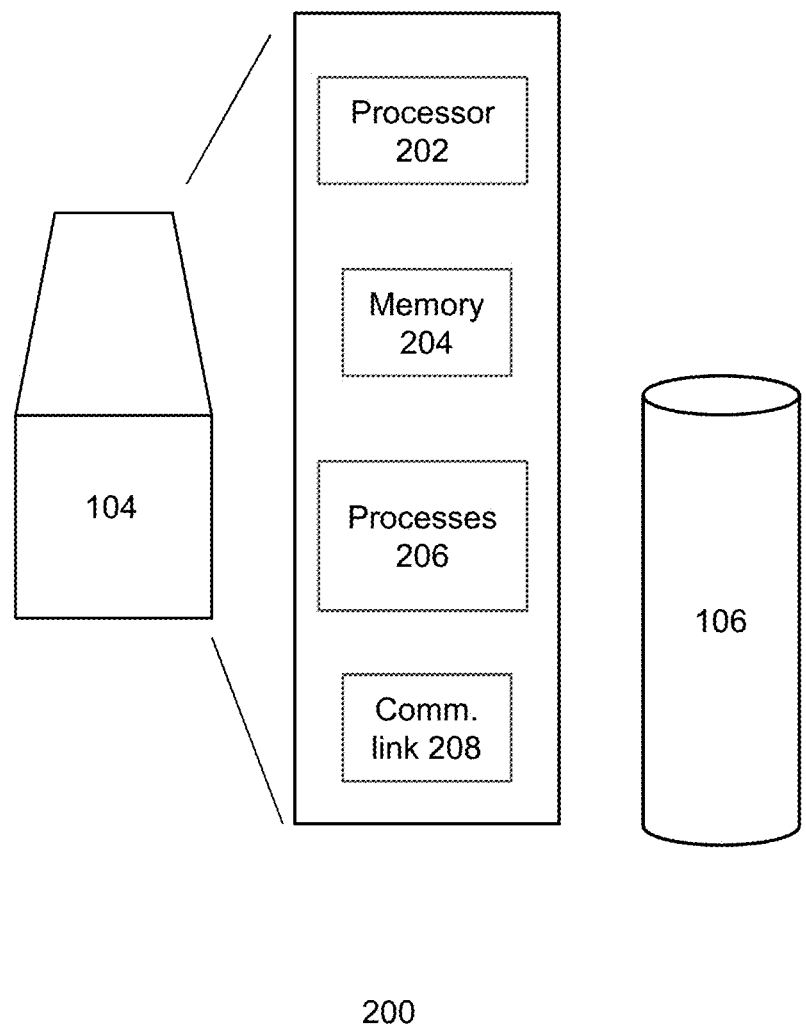
FIG. 2 is a block diagram of the message platform and archiving service of FIG. 1 and a database of the message processing network for an embodiment.

FIG. 2 shows components of platform 104 as provided by an embodiment. Platform 104 may be implemented as a server having a typical processor and as such may be a stand-alone computer, a laptop, a tablet, a server or other computing devices. Platform 104 may be accessed directly at its terminal or remotely through a communication network. Platform 104 has processor 202, memory 204, access to database 106 and communication link module 208. Software accessing database 106, accepts data and processes it for storage into database 106, accepts input for queries from graphical user interfaces (GUIs), user interfaces (UIs), and other sources, generates database results based on same and generates reports and results as described above. Database 106 stores records accessed by platform 104 and may be contained within system 102 or may be accessed remotely. Database 106 stores records and data relating associations for accounts, organizations, contact information and other data as described herein. One or more functions of platform 104 may be distributed among several devices. It will be appreciated that devices 108 and clients 114 may have similar corresponding components and structures to comparable components shown for platform 104.

Briefly, an embodiment provides systems, methods, devices and processes for managing and processing electronic messages generated from one or more message accounts of a user.

A feature of an embodiment provides multiple communication "spaces" in which a user may post messages. A space is a logical construct that is defined for use in a message system, where the space has some defined common topic, goal or feature (e.g. a "Science Fiction Lovers" space). For a given space, protocols may be defined that govern how messages are processed, marked, distributed and retained. Such protocols may be encoded as a set of individual logical privileges that are attributes to message accounts associated with a space. The privileges may be set, reset or revoked as needed for an account. A space manager may have an account that is authorized to manage these privileges and the accounts. Privileges and rights defined for a space and for a user's account for that space collectively determine how an electronic message made by that user in that space is processed. Such processing parameters may include the scope and timing of distribution of the message to other users in the space, augmentation of additional information, labels or tags on the message, vetting of comments or content from the message and message archiving parameters (such as whether to archive the message or not, retention policy for archived messages, etc.). For a given space, a particular message format may be used (e.g. a text message-based format) that may or may not be the same message format as used in other spaces. However, for an embodiment as described herein, spaces within platform 104 use a text message-based format.

An embodiment provides tools and processes to define and use a private space, which is useful for distribution of personal messages from a user. In an embodiment, private messages are messages that the user has almost exclusive paramount control over content and distribution scope. The full privileges for such private messages are ultimately designed and controlled by a system administrator. Features relating to message and account processing that access, update and assess these privileges may be provided by processes and systems operating in platform 104. Such privileges may provide the user with more/full control of how messages are sent (or more perhaps more accurately, providing less/no control or supervision by the system administrator as to how private messages are sent, etc.).

An embodiment also provides tools and processes to define and use an organization space, which is useful for distribution of "professional" messages from a user. For example, an organization space may be utilized when a user wishes to send a message as an agent of an organization, e.g. as an employee of a corporation. An organizational space typically may be subject to additional restrictions as to how the user's electronic messages are processed and vetted. These restrictions may be imposed to conform to internal policies of the organization or to external rules and laws (e.g. the US SEC Rules 17a-3 and a-4, the EU GDPR, and the US HIPAA and HITA). For example, an organization space may impose: restrictions on which its users may distribute messages in that space; validation requirements of identity, business purpose or roles for the message or user; restrictions on roles and actions that may be executed by its users; requirements for data and message logging of actions for its users; encryption standards for data, both for active live actions and actions executed when a previously off-line device re-connects to the space (e.g. a mobile phone in an airplane); access requirements to message and records for users in the space.

It will be appreciated that an embodiment's private/organization space constructs align with decisions made by people and organizations in ordinary professional circumstances. For example, a person and a company make daily decisions that mix professional and non-professional subjects (whether to join a company, whether to hire a person, what to have for lunch, etc.) and use of an appropriate space for a message will inherently align with that context.

As noted earlier, an embodiment permits logical spaces to be created that convey intent to its users. For example, a user may create a professional space if he wishes to communicate in a B2B (business-to-business) and B2C (business-to-consumer) context with other users. A private space may be created if the user wishes to have private communications with other users. At a message session level, a user enters either social message process (sometimes referred to herein as simply "personal message") or professional message process (sometimes referred to herein as simply "professional message") and is authenticated according to the constructs of the selected space. A user entering professional message may be provided with more communication options since he may be entitled to communicate on behalf of an organization. Once inside professional message a user may interleave private and professional communications if desired. It will be appreciated that constructs and operations of Spaces and their implementations may operate independently of other features of an embodiment.

Once a set of spaces have been defined, an embodiment provides different services (i.e. processes) through platform 104 that may be accessed through client 114 on device 108, where each service provides access to a message processing platform to process messages being generated and sent from client 114 to that space.

Before additional features of an embodiment are described, some terms are defined below that are used to describe various operational, functional and structural aspects of logical records, spaces, entities, accounts and processes for messages and message accounts processed by an embodiment:

"Message Platform" An electronic messaging system/server that implements message processing features an embodiment. It is represented generally as platform 104.

"Message Client" A device accessing the message platform according to requests issued from a person.

"Common Platform" A multi-tenanted platform supporting enterprise applications such as message compliance archival and review (and Professional Message), which may be subscribed to by Organizations.

"Message Account" A record maintained by the Message Platform of a person who uses the Message Platform to communicate with other persons. A Message Account includes attributes such as first name and last name as well as a Message Platform logon identity and credentials.

Figure 3:
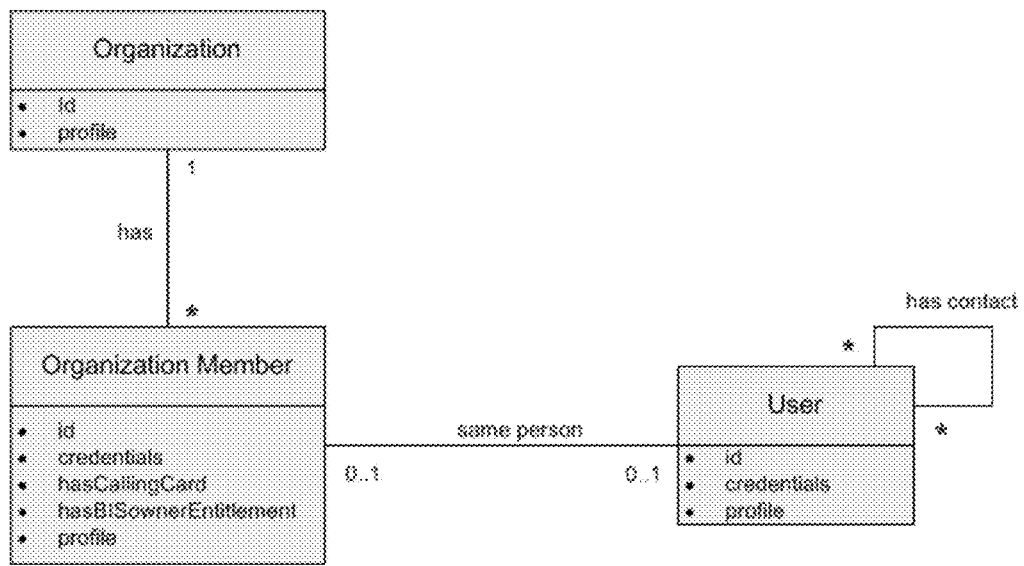
FIG. 3 is a schematic diagram of a data model showing exemplary relationships among a user (account), an organization member and an organization as implemented by the message platform for an embodiment of FIG. 1.

"User" The person associated with a Message Account. A User establishes and controls a Message Account in order to use the Message Platform. As illustrated in FIG. 3, a user maintains a list of other Users that he communicates with frequently (i.e. contacts).

"Organization" A collection of people organized into a community or other social, commercial or political structure. The collection typically has a common purpose or reason for existence (e.g. a common business, society, association, etc.). Organizations subscribe to enterprise applications available on the Common Platform, "Member Account" A record in the Common Platform of a person who uses applications on behalf of an Organization for which that that person is a member. A Member Account may include contextualized attributes for the person, e.g. role(s) within the organization, office location as well as a Common Platform logon identity and associated credentials.

"Organization Member" A person associated with a Member Account. An Organization establishes and controls Member Accounts for members of its organization relating in part to logon permissions to Common Platform services.

"Logon Session" A computing session that begins when a user authentication is successful and ends when the user either logs off of the system or the session times out for security reasons.

"Social Message" A Message Platform entry point for a User. A User who launches Social Message is authenticated against his Message Account.

"Professional Message" A Message Platform entry point provided to an Organization in the Common Platform. An Organization may subscribe to Professional Message so that it may designate members entitled to use the Message Platform for communications on behalf of the Organization. An entitled Organization Member who launches Professional Message is authenticated against the Member Account representing his membership with a particular Organization. Access may be provided on a subscription basis.

"Social Message Session" A Logon Session established for Social Message. A User's entitlements and privileges in a Social Message Session are determined by verification of his identity to a personally managed account rather than an account associated with an Organization. As such, in one embodiment a Social Message Session only permits a User to communicate with other Users on the User's personal behalf.

"Calling Card" An entitlement designation attributable to an Organization Member by an Organization. The bearer of a Calling Card is entitled to enter Professional Message on behalf of the associated Organization. This entitlement mechanism gives an Organization control over which of its members are entitled to communicate on behalf of the Organization. Granting of a Calling Card (and its privileges) is controlled by settings in the Platform.

"Account Federation" An association created between a Member Account and a Message Account for the same person. The first time a person enters Professional Message on behalf of a particular Organization, the associated Member Account is federated with the Message Account. Account Federation requires the person to verify that he can authenticate against both accounts, thereby establishing the existence of a trust relationship (e.g. an employed-by relationship) with that Organization.

"Professional Message Session" A logon Session established for Professional Message on behalf of an Organization. A person may not initiate a Professional Message Session on behalf of that Organization until it is determined that his Member Account is for the same person having has an established Message Account identity. Successful Account Federation establishes that both of these Accounts are for the same person. A Professional Message Session enables a User to communicate with other Users on behalf of the User's Organization or on the User's personal behalf.

"Message-entitled Organization Member" An Organization Member having been assigned a Calling Card and who has successfully federated his Member and Message accounts. As such, this person is entitled to enter Professional Message for communications on behalf of his Organization or on his personal behalf.

The following terms define various relationships for spaces and records containing data and relationships for electronic messages processed by embodiment:

"Interaction Space" (short form "IS" or "Space") A logical space in which users may post content and electronic messages and view content posted by others belonging to that space. A Space may be referred to as a Message Space "IS Participant" A User that views and posts content for a particular Interaction Space.

"IS Posting" (synonym to a "message") Content posted into an Interaction Space.

"Interaction Space Type" A type of Interaction Space. Each Interaction Space is typed according to a defined governing social context(s).

"Private Interaction Space" An IS providing private communications by users and that is not affiliated with any Organizations.

"Professional Interaction Space" An IS providing professional communications for at least one user acting on behalf of his Organization; this IS may involve B2B and B2C communications.

"Business Interaction Space" (short form "BIS") An IS providing controlled communications between Organizations. Control of a BIS (e.g. membership control, privilege control) is decentralized among participating Organizations (i.e. peer-to-peer control). Control may determine access and privileges for a related User (e.g. levels of rights to post and view IS content).

"Company Channel" A Business Interaction Spaces with one BIS Partner. This represents a case where a single Organization exercises access control over sensitive communications.

"Business Channel" A Business Interaction Space with two or more BIS Partners. This represents a more-expected case where multiple Organizations collaborate in peer-to-peer fashion with each Organization exercising access control for its respective members.

"BIS Partner" A participating Organization for a particular BIS. Each BIS Partner has a BIS Owner that controls which of the Organization's Message-entitled Organization Members have access to the BIS.

"BIS Owner" A Message-entitled Organization Member having control of privilege and access granting rights for a particular BIS, on behalf of the Organization. Effectively, a BIS Owner is a proxy for a BIS Partner. This reflects an organization-centered accountability for Business Interaction Spaces. By definition, a BIS Owner has complete access to the BIS (i.e. unrestricted message posting and unfettered message viewing capabilities within the BIS) as well as control privileges.

"BIS Owner Entitlement" An entitlement awarded by an Organization to an Organization Member. The bearer is provided with privileges to create and/or claim ownership of Business Interaction Spaces. By controlling the privileges to the User, an Organization is able to control how many Organization Members are entitled to negotiate with other Organizations to establish BISes.

"Message Directory" A Message Platform service for finding Organizations, Users and Business Interaction Spaces.

The above terms and definitions are provided for brevity and convenience and do not limit their scope or the scope of this disclosure. The disclosure may use other terms not listed above that have a similar meaning to a comparably defined term, which will be clear in context of the usage. Although the terms above are capitalized, whether or not a defined word when used below is capitalized does not detract from its meaning and scope, which will be clear in context of its usage.

Another feature of an embodiment provides federation of a person's member account with his message account. Account federation requires the person to verify that he can authenticate both accounts, thereby establishing the existence of a trust relationship (e.g. an employed-by relationship) with that organization.

Figure 4:
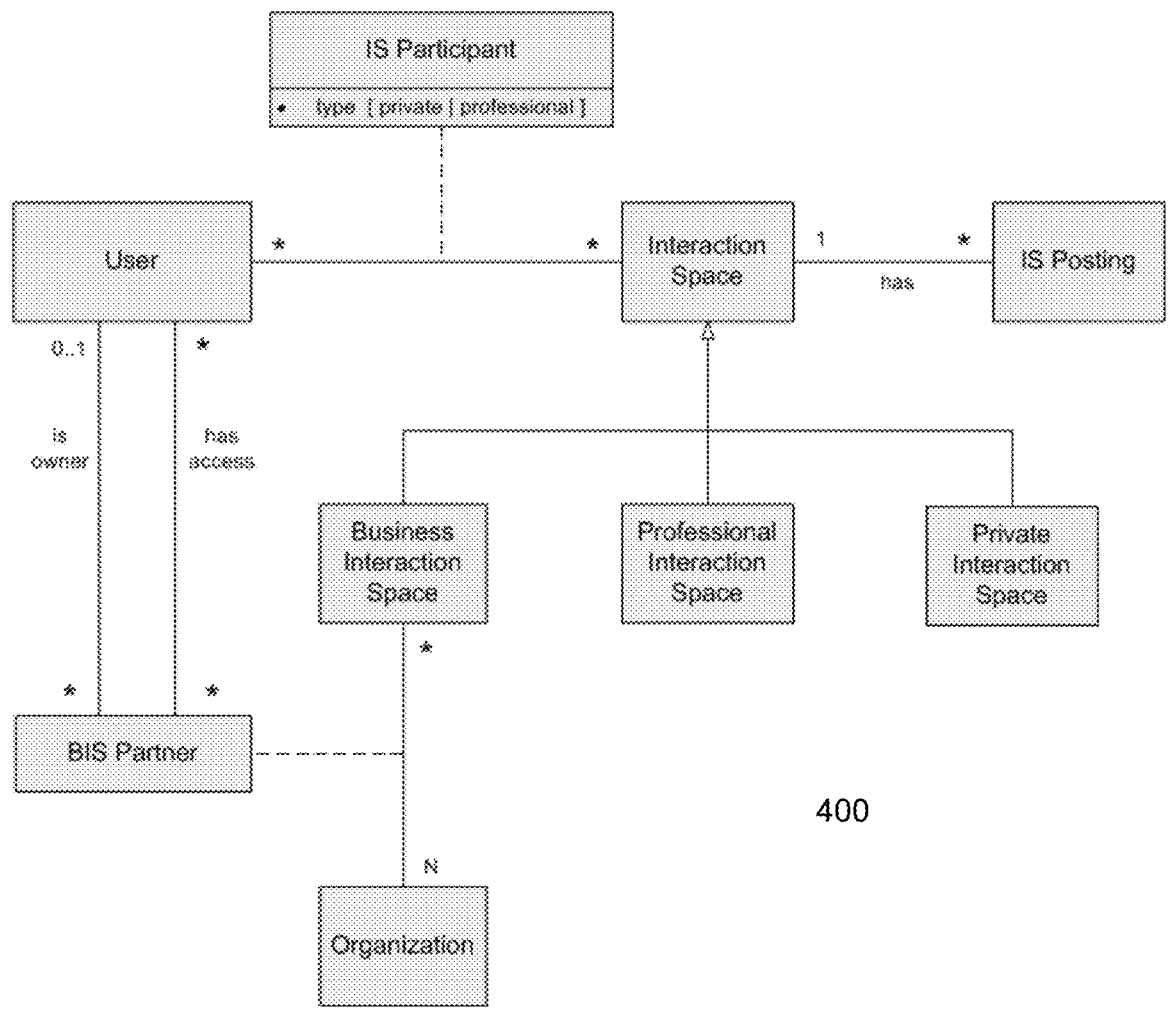
FIG. 4 is a schematic diagram of one data model showing of exemplary relationships with two interaction spaces as implemented by the message platform for an embodiment of FIG. 1.

Referring to FIGS. 1-4, for an embodiment, database 106 contains records and relationships of several entities and accounts (see FIGS. 3 and 4). An embodiment provides definable Spaces for messages that are created and manages how messages in those Spaces are processed.

As noted, a Space has an inherent context (as provided during its definition stage) that is used to reflect relevant organizational; regulatory or other requirements for electronic messages processed through that Space. The context inherently indicates obligations and expected actions for Messages sent through that Space. For example, messages posted to Professional and Business Interaction Spaces are subject to SEC regulations relating to retention. Each Space operates and exists independently of other Spaces. For example, entering into a Professional IS subject to enterprise-based regulatory governance does not preclude the User from entering a different Private IS. Exemplary IS provided by an embodiment include:

Private Interaction Space
Organizations affiliated with Users have no governance over IS Postings. An IS Participant may freely invite other Users to the Space.

Professional Interaction Space
For an embodiment, a User may participate in a Professional Interaction Space either as: a Private IS Participant acting on his own behalf (e.g. as a "consumer" in a B2C communication); or as a Professional IS Participant acting on behalf of his Organization (e.g. the "business" in a B2C communication. Each Private IS Participant is authorized to invite other Private IS Participants into an existing Professional Interaction Space. Similarly, each Professional IS Participant is authorized to invite other Professional IS Participants into an existing Professional Interaction Space. An Organization has the authority to archive and review posted content if at least one of the IS Participants is participating on behalf of the Organization.

Business Interaction Space
For an embodiment, BIS Partners set access privileges to control which of their Message-entitled Organization Members are entitled to participate in a BIS. A Message-entitled Organization Member may have privileges allowing him to identify a BIS that he has been granted access to, via a search of the Message Directory. For an embodiment, BIS Users are designated to be Professional IS Participants and each BIS Partner is provided with privileges to archive and review content posted to a BIS.

An embodiment provides different categories of message sessions, including: a Social Message Session (where a related process used to activate this Session on device 114 is sometimes referred to herein as "Social Message"), which provides a messaging forum where the User can represent himself in the message communication with other users; and a Professional Message Session (where a related process to activate this Session on device 114 is sometimes referred to herein as simply "Professional Message"), which provides a messaging forum where the User can represent either his Organization in communications or himself. Service sessions are entered by authenticating the User against the appropriate account. Social Message Sessions are established by authenticating against the User's Message Account. Professional Message Sessions are established by authenticating against a Member Account that is federated with the User's Message Account.

In one embodiment, a person's Message Account is deemed to be sufficient for access to Social Message independent of any organization memberships. When a User joins an Organization, he may wish to communicate to others as being a Member from that Organization. In order to communicate on behalf of the Organization, a person must have a Member Account for the Organization and proper privileged and credentials from the Organization. To provide these credentials, an embodiment uses the Calling Card construct with the Account. A Calling Card is akin to a "talking stick"/"speaker's staff" that is awardable to a User by an Organization. For an embodiment, in order for a User to have the privileges to be able to use Professional Message, the User needs (1) to have been assigned an appropriate Calling Card from the Organization; and (2) to be able to securely associate his message identity with his member identity—i.e. prove that he is the person represented in both accounts. Other credentials may be set to a Calling Card as needed by an Organization.

The first time Professional Message is entered on behalf of an Organization, the User must federate his Member Account with his Message Account, thereby verifying that he is the person represented by both accounts. When the User leaves the Organization, his Member Account is deactivated, thereby dissolving that Account Federation. This constitutes a repeatable process whereby a User creates a single Message Account, which may be repeatedly federated and un-federated with member accounts as the User joins and leaves Organizations.

The Tables below provide some exemplary details on fields stored for user account records:

| Message Account | |
|---|---|
| Field | Contents |
| First Name | Bob |
| Last Name | Smith |
| Personal email address | bsmith@email.com |
| Personal phone number | (555) 555-1212 |
| Other data | |

| Member Account | |
|---|---|
| Field | Contents |
| Office Location | Main |
| Title | President |
| Organization email address | Bsmith@company.com |
| Organization phone number | (555) 666-1212 |
| Other data | |

It will be appreciated that other data structures stored, used and updated by an embodiment track entitlements and statuses of accounts and message systems. Contents of these data structures will be reviewed to determine how account and message requests from users and the system are processed.

Now additional details are provided on actions and events that are conducted on messages and accounts as a User joins and leaves organization(s).

Establishment of a Message Account by a User creates an electronic record of a verifiable, personal identity used by Message Platform to identify and locate the User. When an Account is first established, the User becomes visible in the Message Directory and has access to Social Message.

Figure 5:
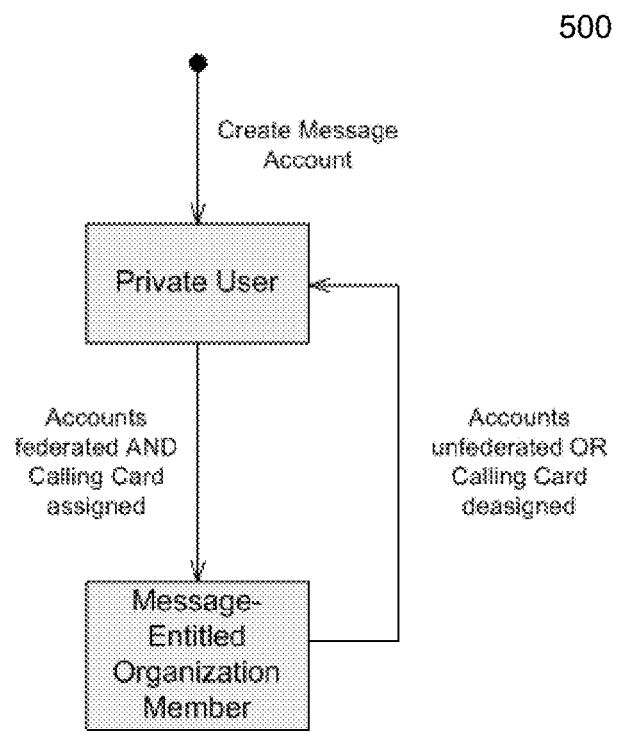
FIG. 5 is a schematic diagram of a state machine illustrating an exemplary life cycle of a user (account) executed by the message platform for an embodiment of FIG. 1.

FIG. 5 shows aspects of a "life cycle" for a User illustrating how a Message Account progresses through various states as his messages are processed by an embodiment. As noted earlier, a User's Message Account may or may not be linked to a Member Account associated with an Organization. This association is determined via a federating process of the User's Accounts. A User is in one of two states as illustrated in state diagram 500, first as a Private User and then as a Message-entitled Organization Member. As a Private User, the User's Message Account is not linked to a Member Account for an Organization. The User may only represent himself in his messages with others. As a Message-entitled Organization Member, the User's Message Account is linked to a Member Account for a particular Organization. In this state, the User is entitled to communicate with others, either as himself or as a designated representative of the related Organization.

Figure 6:
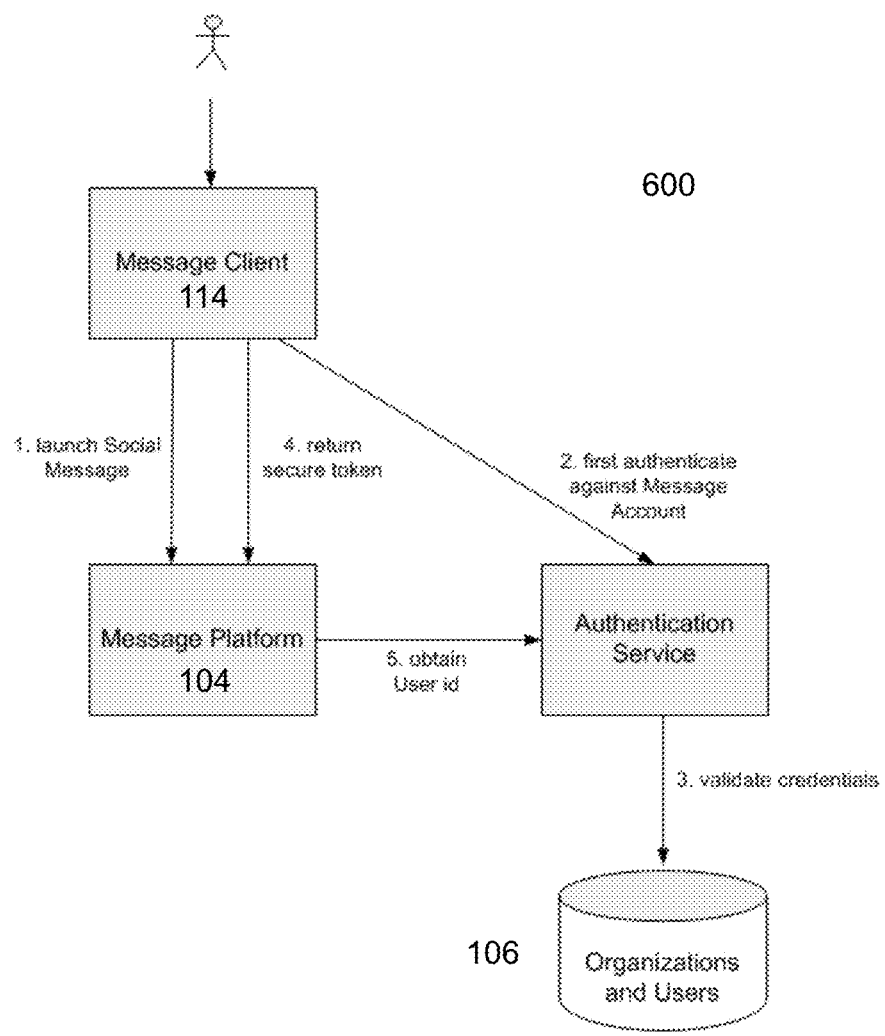
FIG. 6 is a schematic diagram of message account authentication steps by the message platform for an embodiment of FIG. 1.

FIG. 6 illustrates User authentication as a side-effect of launching a Social Message Session:
  i) launching a Social Message Session by the User on his device;
  ii) intercepting the action and redirection of the service request to an authentication service in the message platform;
  iii) presenting at the device of credentials to be validated against his Message Account; and
  iv) returning control of action to the device for entry into a Social Message Session, this time with a secure token.

The secure token is used by an embodiment to obtain a User ID from the authentication service and the ID serves as a messaging address for the User.

Social Message Sessions provide access to one or more of the following additional processes/functions:
  Searching Message Directory for Users and Organizations;
  Initiating Private Interaction Spaces with other Users;
  Responding to Private Interaction Space invitations from other Users;
  Posting to and viewing IS Postings for a Private Interaction Space;
  Inviting additional Private IS Participants into a Private Interaction Space;
  Soliciting advice from a Message-entitled Organization Member by initiating a Professional Interaction Space with that User. This instantiates a B2C Professional Interaction Space where our User is a Private IS Participant and the other, a Professional IS Participant. For instance a Private IS Participant may use a B2C Interaction Space to solicit advice from a financial consultant;
  Inviting additional Private IS Participants into a Professional Interaction Space. For example, a spouse may be invited into a B2C consultation with a financial advisor. A Private IS Participant cannot invite additional Professional IS Participants as this infringes on the rights of the initial advisor invited into the B2C communication; and/or
  Establishing a personal contact list comprised of Users that are frequently messaged.

Figure 7:
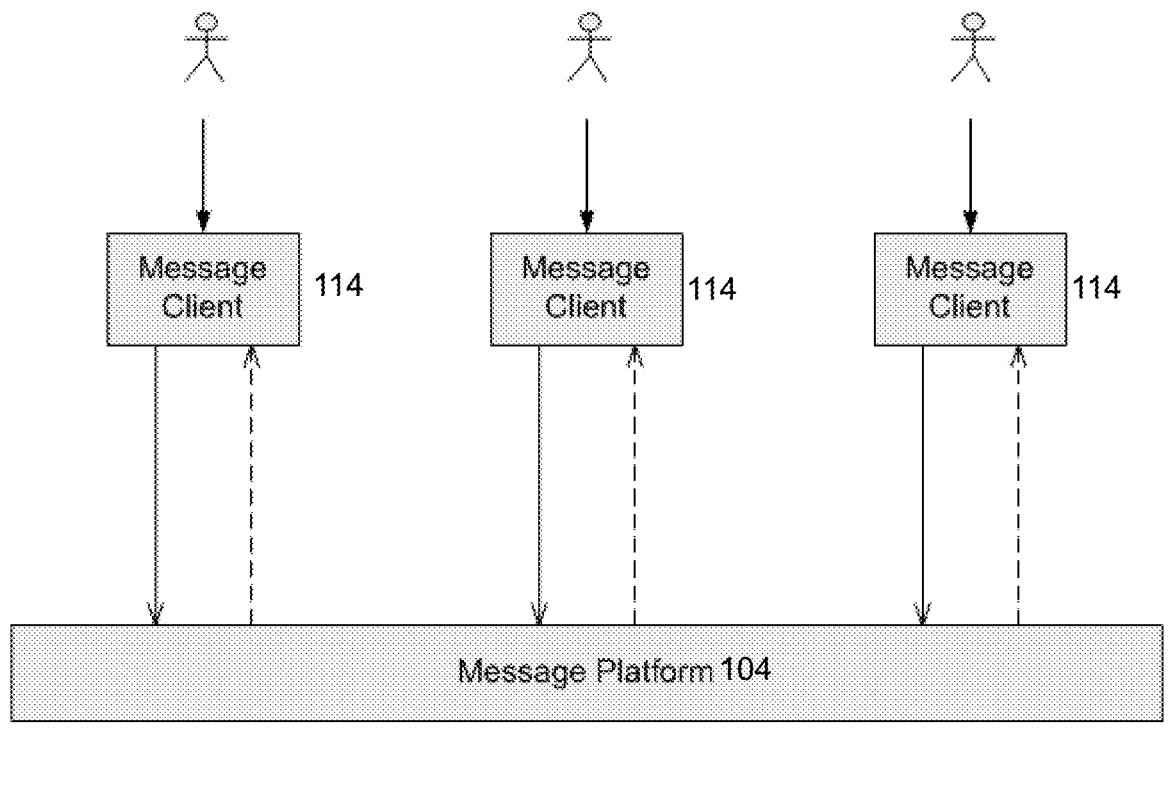
FIG. 7 is a schematic diagram illustrating interactions of users in a private interaction space by the message platform for an embodiment of FIG. 1.

FIG. 7 illustrates relationships of three online Users with platform 104 and database 106 that communicating via a Private Interaction Space. The solid directed lines represent messages submitted by Users to platform 104. The broken directed lines represent real-time messaging events distributed from platform 104 to online Interaction Space participants.

Figure 8:
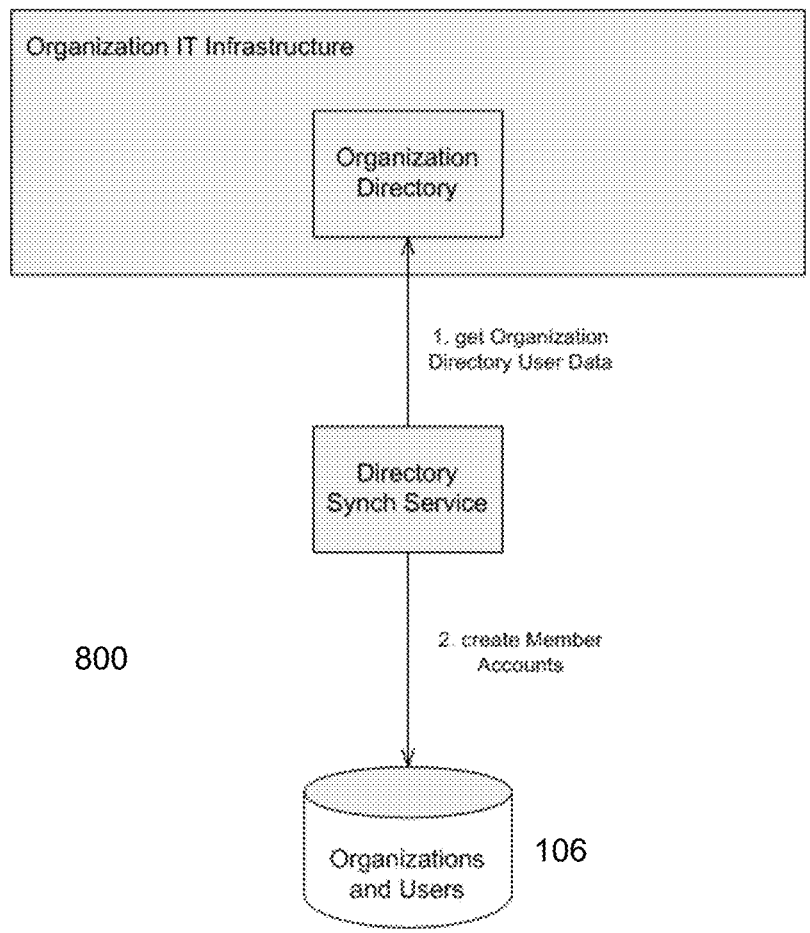
FIG. 8 is a schematic diagram illustrating components of the message platform for an embodiment of FIG. 1 when executing directory synchronization functions.

Referring to FIG. 8, in operation, when an Organization subscribes to enterprise applications available on the Common Platform, including Professional Message, its Member Accounts and entitlements to the Accounts need to be identified and assigned. Such Professional Message entitlements include Calling Cards and BIS Owner Entitlements.

To assist in provisioning member accounts, an embodiment provides a directory synchronization service to enable an Organization to synchronize its Member Accounts with its IT Directory Service information (e.g. data in its Microsoft Active Directory). Directory synchronization ensures that personnel and staffing decisions (e.g. hiring, internal group affiliations, terminations, job titles, seniority, etc.) are coordinated with information in database 106.

An Organization controls visibility of Member Account attributes in the Message Directory Profiles of its Users. An Organization can choose to make more attributes visible to Users in its Organization than to Users not in its Organization. For example the "job title" attribute of Member Accounts may be visible to Users within the Organization but hidden from Users outside the Organization.

Now, additional details are provided on how an individual, non-affiliated User is incorporated into an Organization by an embodiment. Referring to FIG. 8, consider a situation where a User has just joined an Organization. Initially, the Organization may assign to the User a Calling Card so that he may access the Professional Message service.

When the new Organization Member launches the Professional Message service, the embodiment federates the User's Member Account with the Message Account. Account federation requires the User to verify that he can authenticate against both accounts, thereby establishing the existence of a trust relationship (e.g. an employed-by relationship) with the Organization. A successful federation establishes a persistent representation of the "same person" relationship illustrated in FIG. 3. It will be appreciated that constructs and operations of account federation may operate independently of other features of an embodiment.

Figure 9:
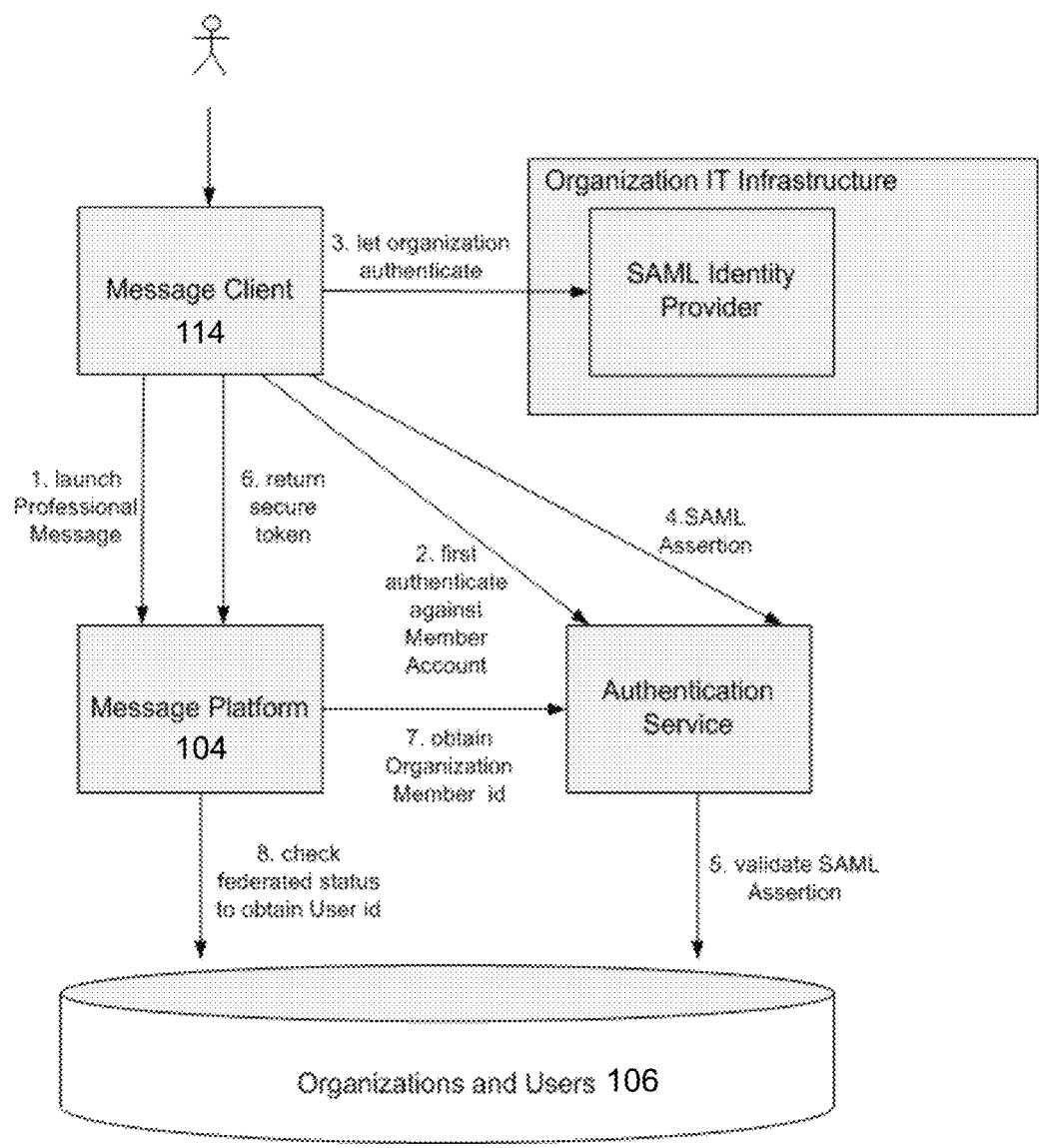
FIG. 9 is a schematic diagram of organization account authentication steps by the message platform for an embodiment of FIG. 1.
Figure 10:
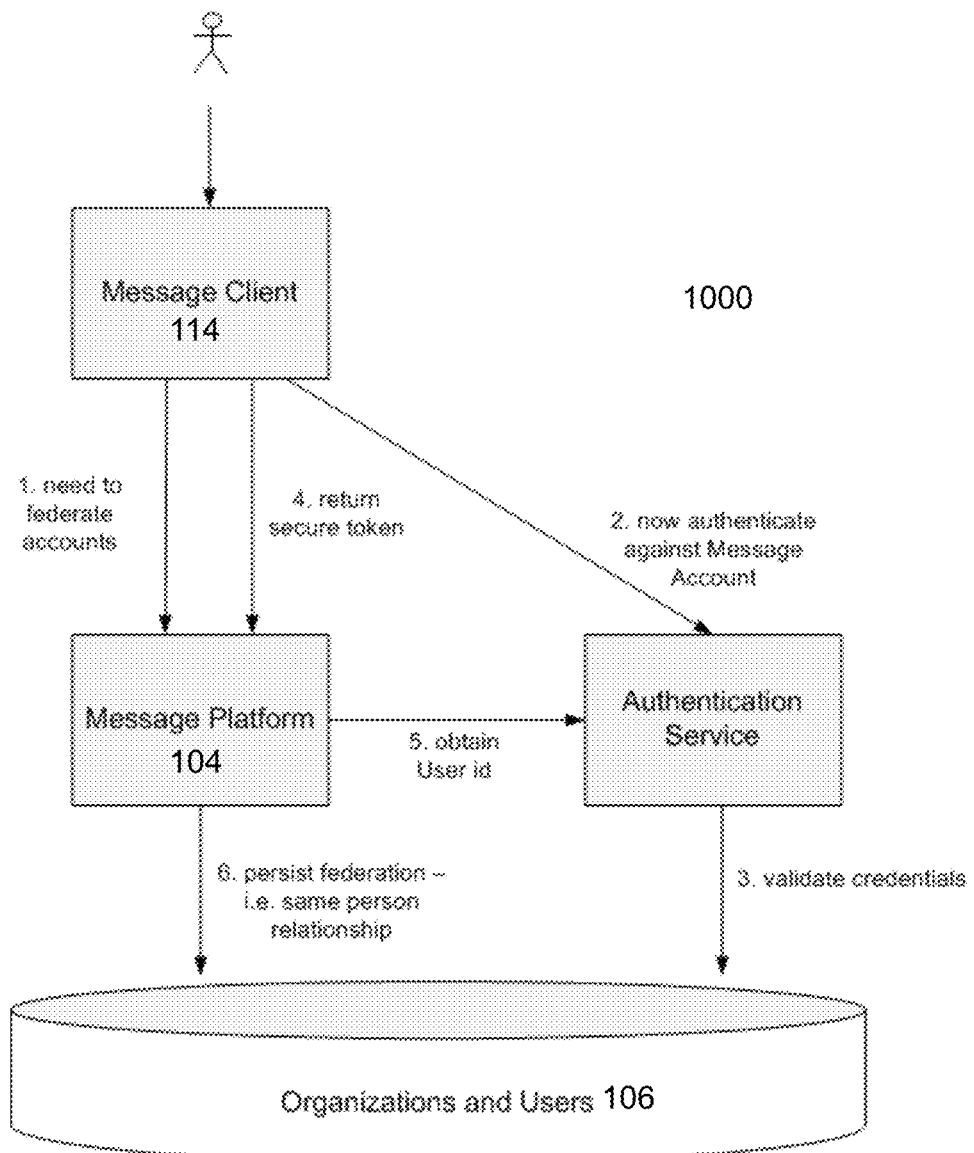
FIG. 10 is a schematic diagram of account federation steps by the message platform for an embodiment of FIG. 1.

An exemplary federation process is illustrated in FIGS. 9 and 10. FIG. 9 illustrates processes executed by client 114 on device 108, platform 104 and a general authentication service (GAS) operating at platform 104. After a Professional Message service is launched on device 108, the User is authenticated against his Member Account through the GAS and the Organization's IT infrastructure. Authentication activates a lookup process to identify the User's Member Account and whether it is currently federated with his Message Account. The Organization's authentication services typically support Security Assertion Markup Language (SAML) protocols, which provides an Organization with complete control over how its Members are authenticated. As illustrated in FIG. 9, the User is authenticated via a SAML Identity Provider, which is a part of an Organization's IT infrastructure.

After the User is authenticated against his Member Account, if the Member Account is not currently federated with his Message Account, he is authenticated against his Message Account. After a successful Message Account authentication, a persistent representation of the "same person" relationship illustrated in FIG. 3 is established; the User's Member Account is now persistently federated with his Message Account. On subsequent Professional Message login(s), authentication against the User's Message Account is not needed. It will be seen that under SAML Member Account authentication, avoidance of subsequent Message Account authentication, provides a single sign-on experience for the user.

FIG. 10 illustrates processes executed by client 114, platform 104 and the GAS in federating accounts. In an embodiment, once accounts are federated, platform 104 persists the "same person" link between the User's Member and Message Accounts, which acts as a persistent record of the Account Federation. A successful account federation associates the Message User with an Organization; this association is visible to the general body of the system's Users. This affiliation between the User and the Organization represents an authoritative trust relationship between the User and the Organization. It is authoritative in the sense that both parties contribute to the linkage; an organization establishes Member Accounts and Calling cards; a user establishes that he represents the same person who is able to authenticate to the newly provisioned Member Account as well as his Message Account. The affiliation is first established when the User launches Professional Message service on behalf of his Organization; and it is naturally severed when the User leaves the Organization and his Member Account is deactivated (which invalidates any entitlements assigned by the Organization).

In an embodiment, when a User successfully accesses platform 104 using a Professional Message service entry point, the User is able to communicate with others on behalf of his Organization as governed by entitlements assigned to his Member Account by that Organization. For example, this includes entitlements to be able to:

Initiate a Professional Interaction Space, as a Professional IS Participant;

Accept a Professional Interaction Space invitation for participation as a Professional IS Participant and to communicate with other IS Participants in that context;

Invite additional Professional Participants into a Professional Interaction Space;

Discover, in the Message Directory, a BIS that he has been granted access to;

Join a BIS that he has been granted access to and communicate with other BIS Participants in that context;

Create a new BIS and communicate with other BIS Participants (subject to User having the BIS Owner Entitlement);

Discover, in the Message Directory, a BIS involving his Organization, which lacks an owner for his Organization (subject to User having the BIS Owner Entitlement); and/or Claim a BIS ownership on behalf of his Organization and communicate with other BIS Participants (subject to User having the BIS Owner Entitlement).

Turning now to access and archiving features of an embodiment, IS message archiving is performed on an Organization-centric basis applying rules that navigate potentially contradictory goals involving a user's privacy rights and an organization's requirement to comply with external regulations. An IS Posting may be stored in multiple organization-centric archives as a side-effect of the IS Posting having taken place for either a Professional or Business IS. The IS Posting being archived has a Professional IS Participant acting on behalf of the Organization when the IS Posting was made. Archived IS Postings includes a metadata representation of a context under which data was posted. For example, it is recorded that the posting was made by a private individual in the context of a B2C IS. This ensures that archived content is readily interpreted after-the-fact with regard to an original intent of the posting users.

Figure 11:
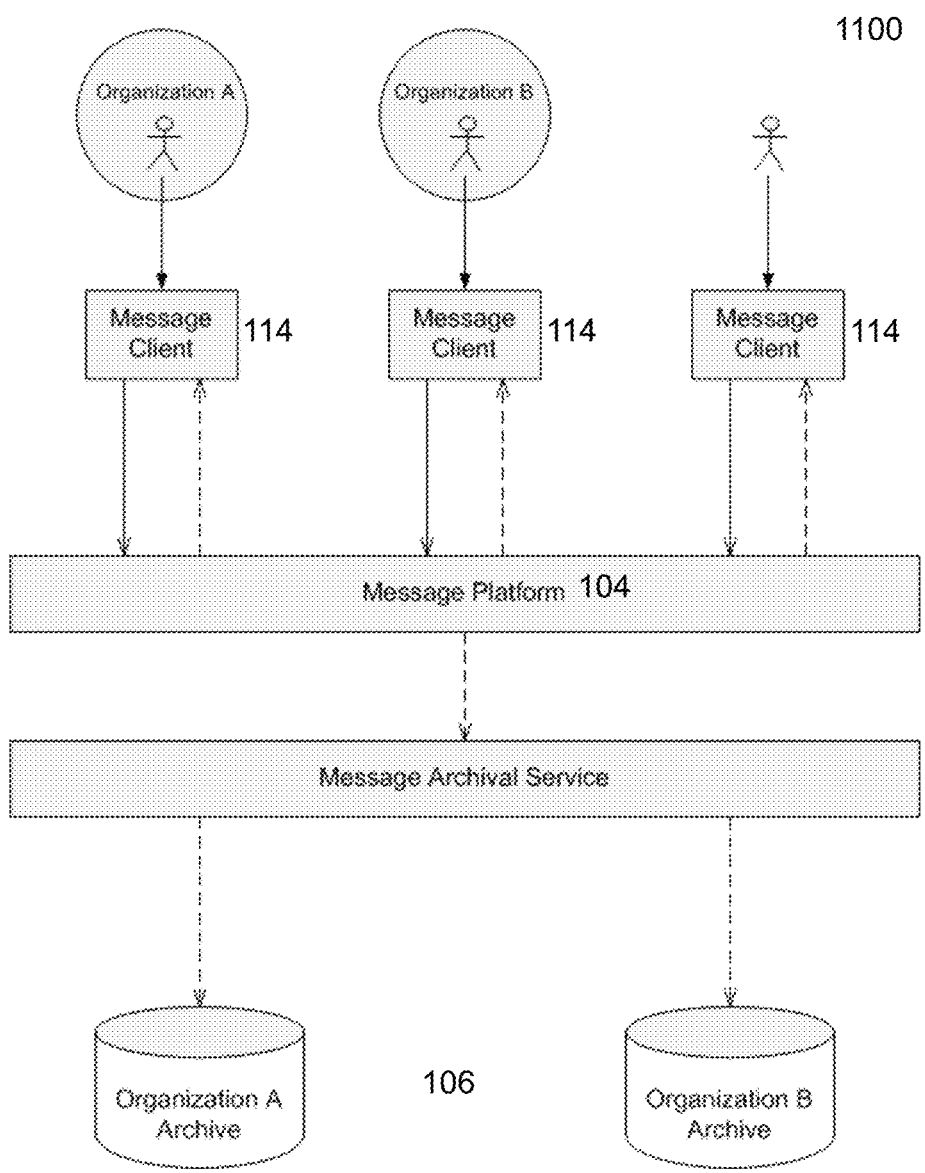
FIG. 11 is a schematic diagram illustrating interactions of users in a professional interaction space by the message platform for an embodiment of FIG. 1.

FIG. 11 diagrammatically illustrates relationships among three exemplary Users to platform 104 and an archiving service. The users are communicating via a Professional Interaction Space. A first User is a Private IS Participant; the second and third are Professional IS Participants with Organizations A and B, respectively. For archiving purposes, the designations of the second and third User as being Professional IS Participants for his Organizations means that platform 104 will archive IS messages by pushing them to an archival service, which causes these messages to be retained in designated archives for Organizations A and B.

For access privileges, a BIS Owner may grant a User access privileges to a particular Business Interaction Space related to the User's function within the Organization. For an embodiment, the access right enables a User to: discover the BIS in the Message Directory; and join the BIS in order to view and post content.

As well, the Organization may grant a User privileges to be a BIS Owner. For an embodiment, a BIS Owner Entitlement enables the User to:

Create a new BIS spanning one or more Organizations, where upon creation of the new BIS, the user is designated as the BIS Owner of the BIS for his Organization and can communicate with other BIS Participants in that context; and/or Claim a vacant BIS Owner role for a BIS and communicate with other BIS Participants in that context. Since Organizations in a BIS are connected in a peer-to-peer control relationship, it is likely that a BIS would be created by another Organization, in which case the BIS Owner role is vacant for all Organizations but for the initiating User. The entitled User may discover BISes with vacant BIS Owners in the Message Directory and claim the role.

Figure 12:
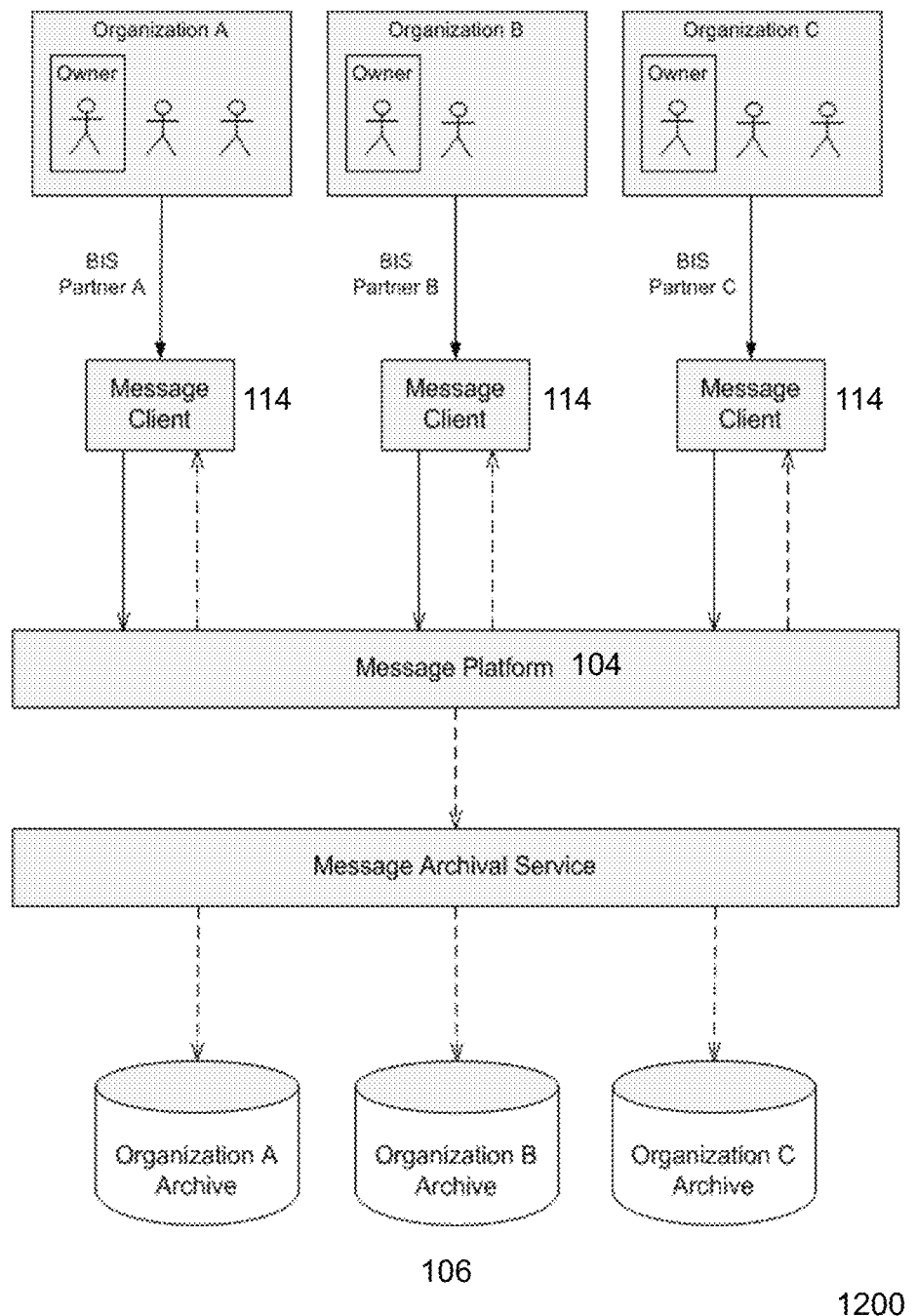
FIG. 12 is a schematic diagram illustrating interactions of users in a business interaction space by the message platform for an embodiment of FIG. 1.

FIG. 12 diagrammatically illustrates relationships among three BIS Partners interacting in a BIS, highlighting that Organizations are direct participants of BISes. Users having a Privileged status associated with the Organizations may claim vacant Ownership roles and may then grant access privileges to other Organization Members to participate. Platform 104 pushes BIS messages to the archiving system to have those messages persisted for each Organization.

It is noted that when a User is newly joined to an Organization, the User gains new privileges as provided for the Organization, but still retains messaging privileges previously ascribed to him as an individual in a Private IS.

Now, further details are provided on actions executed by an embodiment in managing a withdrawal of a user from an Organization. When a User leaves, his Member Account for that Organization needs to be deactivated. Deactivation naturally dissolves the User's Account Federation. This dissolution changes the User's privileges and visibilities to other users in that:

The larger community of Users in the system have visibility/notifications that the User is now not affiliated with that Organization; and The User cannot be authenticated against his Member Account associated with that Organization. Without that authentication, the User cannot launch a Professional Message Session for that Organization. The User loses any associations with: BISes on behalf of the Organization; and Professional Interaction Spaces on behalf of the Organization.

As a corollary, rights and privileges of an Organization may also be affected by the User's deactivation from it. For example, if the User was the last remaining user of the Organization in a Professional Interaction Space acting for the Organization, compliance, archiving, and other related actions and governances for that Professional Interaction Space for that Organization are automatically terminated. This includes rules regarding archiving of messages. As well, if the User had any BIS Owner positions for BISes for the Organization, these positions are vacated for the Organization.

Figure 13:
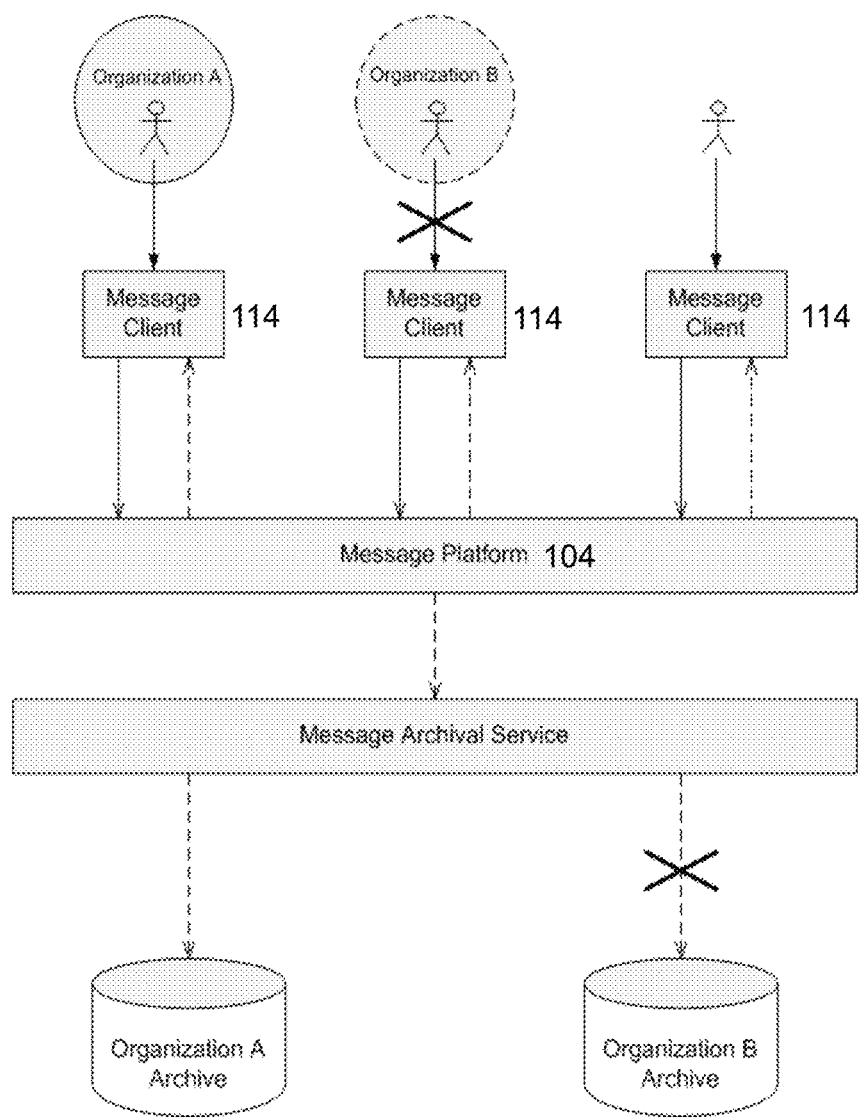
FIG. 13 is a schematic diagram illustrating automatic archival termination by message platform for an embodiment of FIG. 1.

FIG. 13 illustrates effects on the Professional Interaction Space shown in FIG. 11 when a User as the sole IS Participant from Organization B leaves. The User loses access to the Professional Interaction Space. As well, since there is no remaining active IS Participant for Organization B, subsequent messages would not be archived to the Organization B archive.

When a BIS Owner leaves an Organization, the related BIS Owner role is vacated. An Organization's BIS Owner vacancies are visible in the Message Directory to Organization Members, having the BIS Owner Entitlement. As such, a member with such privileges may then claim ownership, thereby providing continuity for Business Interaction Space accountability to an entitled Organization Member. Such a transfer of proxy ownership reflects the direct relationship between BISes and participating Organizations. Notably, while individual Users join and leave an Organization, the direct relationship between an Organization and a BIS remains intact.

Figure 14:
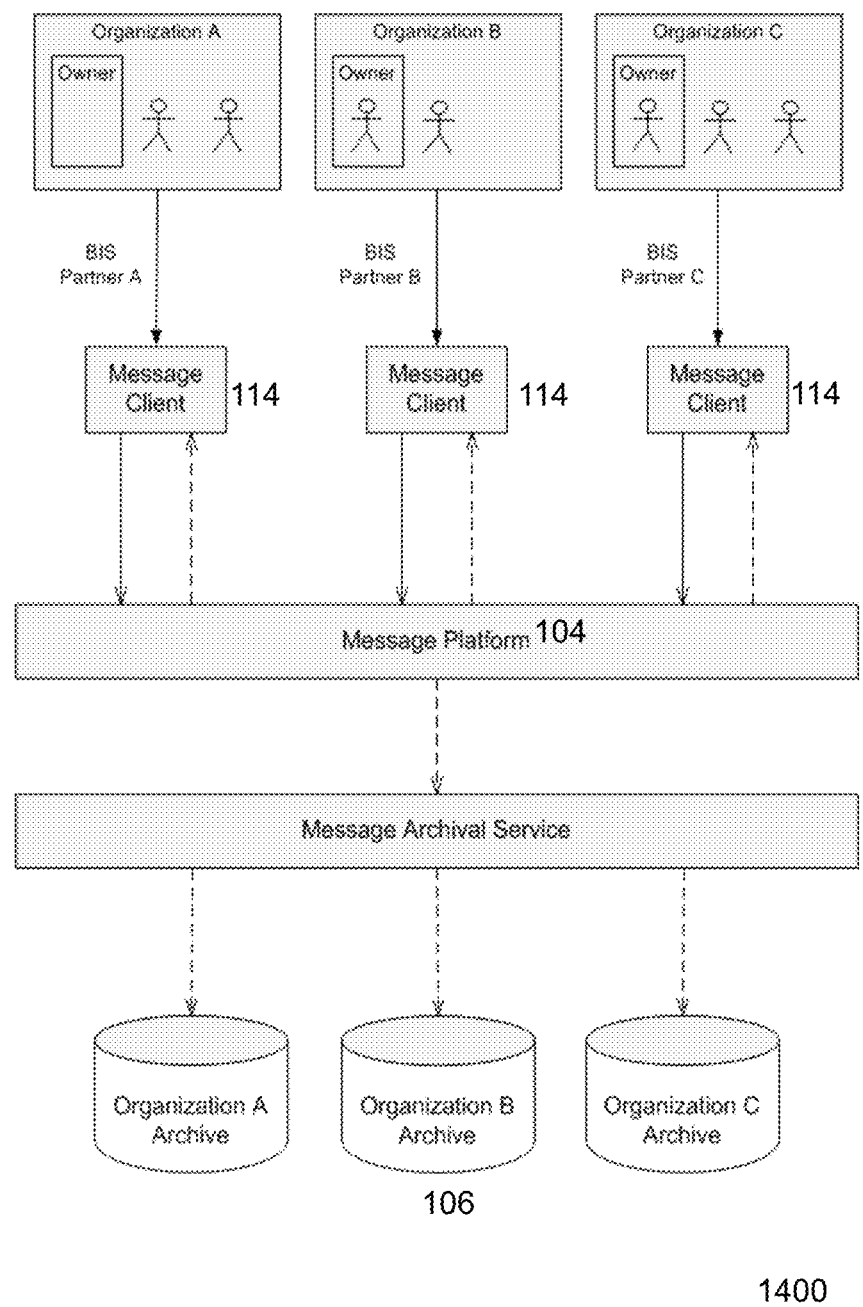
FIG. 14 is a schematic diagram illustrating interactions when an owner leaves an organization as processed by the message platform for an embodiment of FIG. 1.

As illustrated in FIG. 14, relationships among the entities shown in FIG. 12 are changed, where the BIS Owner for Organization A is now vacated (shown by the empty Owner box). At some point, another Member in Organization A having the appropriate entitlements may fill the vacant position.

Leaving an Organization terminates a User's access and privileges to communicate through platform 104 on behalf of the Organization. However, the User's communication access and privileges as a Private Individual typically are not changed. For example, in one embodiment:

The User's Message Account remains including the User's personal profile;

The User's participation in any Private Interaction Space (s) remains intact;

The User's private participation in any Professional Interaction Space(s) remains intact;

The user may still launch and use Social Message; and/or

The User's personal contact list that has accumulated while affiliated with the former Organization remains intact. This retention mirrors real-life business norms whereby a person retains and build networks of contacts as he progresses through associations with multiple organizations.

After a User leaves an Organization, his Message Account is no longer federated (linked) with his Member Account. Depending on restrictions imposed by the Organization and the Message Account, when a User subsequently joins a new Organization, he would be entitled initiate communications in the context of this new relationship.

Figure 15:
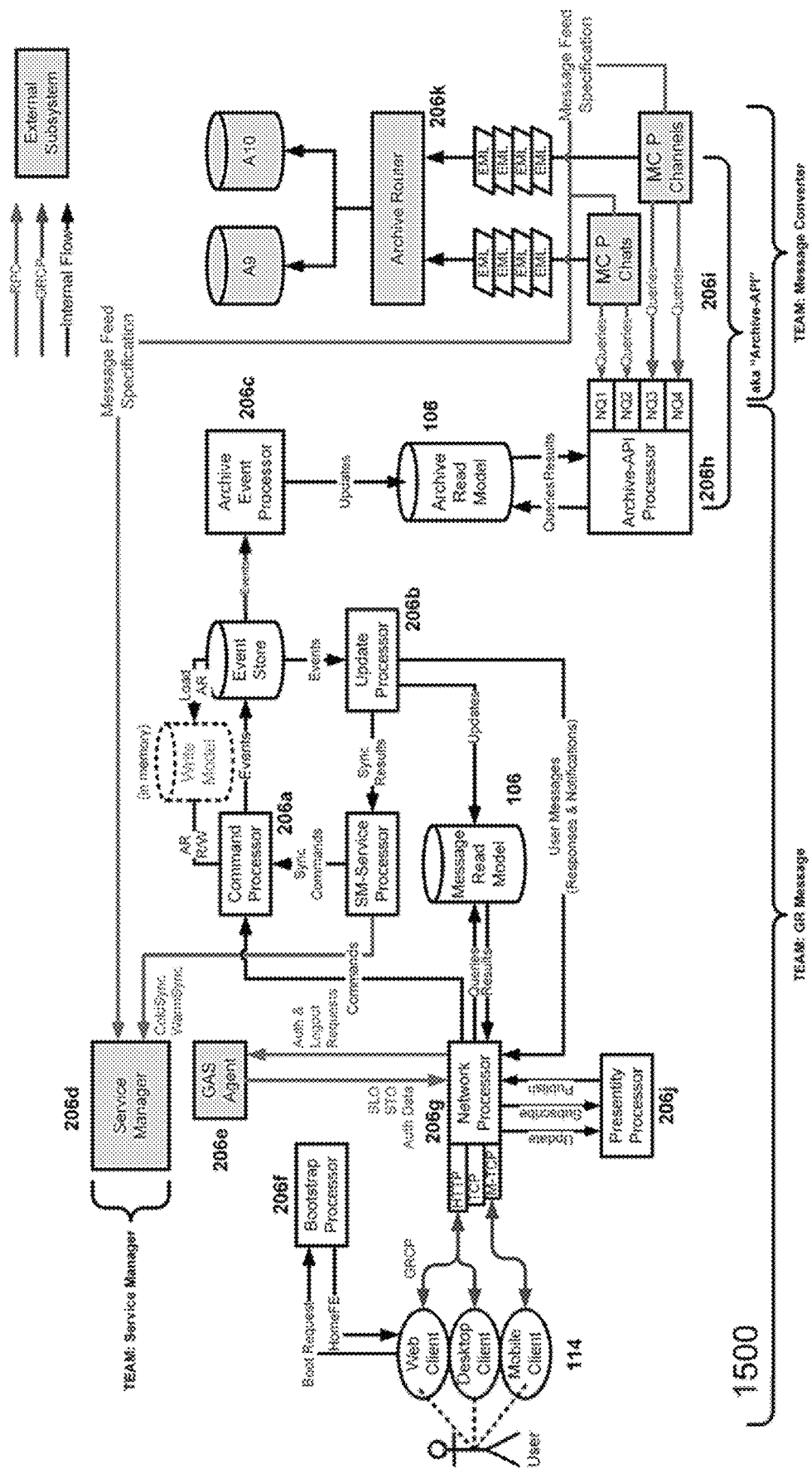
FIG. 15 is a schematic diagram illustrating components of the message platform for an embodiment of FIG. 1.
Figure 16:
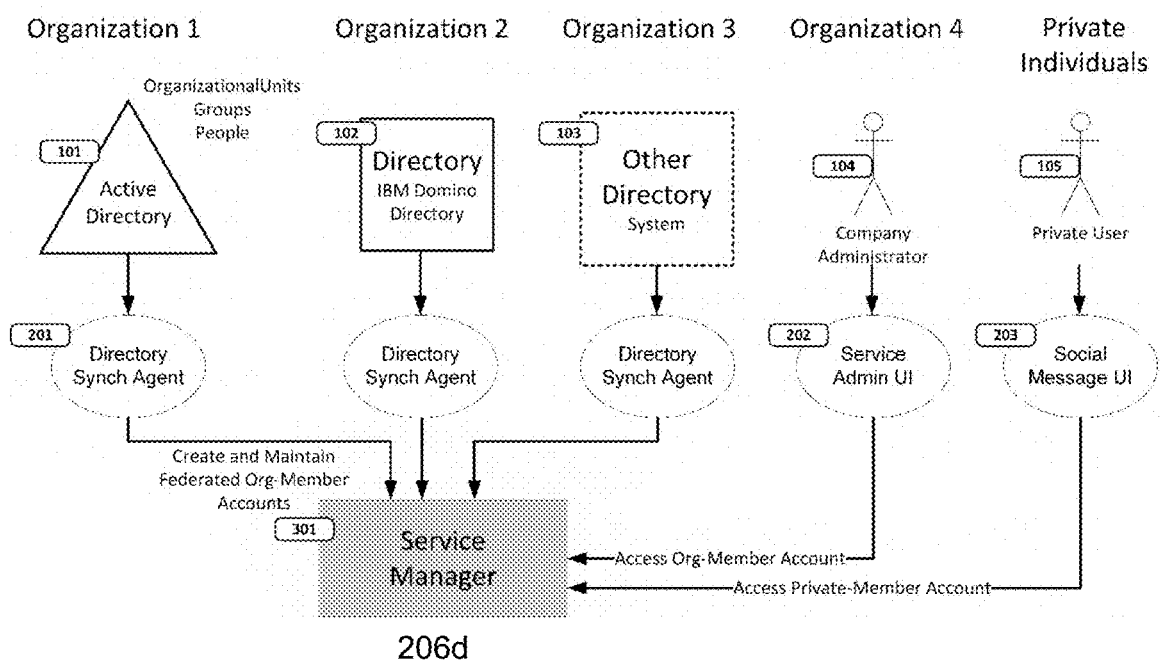
FIG. 16 is a schematic diagram illustrating integration of organizations with a service manager component in the message platform of FIG. 15 according to an embodiment.

Referring to FIGS. 2, 15 and 16, further details are now provided on exemplary computing components and databases executing these functions for an embodiment having regard to aspects of functionalities and relationships among Users, Spaces and Organizations and aspects of exemplary processes executed by a User joining and leaving an Organization described above.

Referring to FIGS. 2 and 15, message platform 104 provides processes that facilitate scaling of scope for processing messages from multiple Users and multiple Organizations and processing commands and queries generated by all of the Message Clients. Further detail is provided for notable components.

Service manager 206d is a component supporting directory synchronization features to external account directories for Organizations. The external directories include Microsoft Active Directory, IBM Domino Directory, lightweight directory servers with an LDAP API, and direct administration through a hosted web portal. All Organizations, Organization Members and Users are provisioned in Service Manager 206d.

SM Service Processor 206b implements cold and warm message synchronization facilities to replicate Organization Members and Users to message platform 104, which are persisted to the Message Read Model.

In operation, users at devices 108 access message platform 104 via a client applications 114 installed on the relevant device, such as a web client, a desktop client, or a mobile client. There are several supported operating systems for these clients including Windows, Linux, MAC OS, iOS, and Android.

Once client 114 is activated and a command is generated to initiate a message request, an authentication process is initiated on platform 104 by the Global Authentication System (GAS) 206e, which supports several authentication protocols including Password, 2-Factor, and SAML.

After the User is authenticated, client 114 is directed by bootstrap processor 206f and GAS 206e to connect to an available network processor 206g, using a client-specific protocol and port. Client 114 may use an agreed upon communication protocol (e.g. TCPIP) to maintain connections to the associated network processors 206g.

In an embodiment, network processor 206g process queries and message commands sent from client 114. Network processor 206g interacts with GAS 206e to process User authorizations, user logout requests and requests from GAS 206e for a single logout (SLO), a session timeout (STO) and an Activity Check.

Presentity Processor 206j (short for "Presence Entity" Processor) has processes interacting with processes on network processor 206g to manage account presence services, such as subscription requests for an account to be deemed a watcher, requests to publish presence notifications to watchers, and requests to compute aggregate presence status of multiple clients of the same user.

Processor 206a has processes to execute commands and record results of a command as one or more events in event store service (that accesses database 106).

Functions of message platform 104 relating to a Space (such as creating an IS, inviting users to an IS, sending messages to an IS, etc.) are provided as message primitives and executed by the command processor according to any applicable business logic and policy constraints of the Space.

Archive event processor 206c reads events from the event store and encodes them into a stream of events in an archive read model (as part of database 106). Processor 206c encode events in the stream in adherence to processing and archiving rules.

Archive API processor 206h is a query engine that translates query remote procedure calls received on an external interface to internal queries on the archive read model and formats results for output.

Message converter processes (MC P) 206i obtain message feed specifications from service manager 206d. Archive-API 206h and MC P 206i may be considered as each being separate logical streams of data for the different types of Interaction Spaces supported by platform 104:
  a) "Chats" comprising Private and Professional Interaction Space data; and
  b) "Channels" comprising Business Interaction Space data.

Message Converter converts results of remote procedure calls to Archive-API 206h into Chat or Channel "Transcript EMLs" as appropriate. Email files (e.g. EMLs) are delivered to archive router 206k for placement in the database archives of the organization following the related message feed specification.

As well, platform 104 provides an architecture that supports mediation of privacy and control over Social Interactions via business logic found in the following components.

In command processor 206a, processes control privileges and actions available to a User. Processor 206a evaluates how the client of the User launched the message platform (e.g. either via a Social Message Session or a Professional Message Session). For a Professional Message Session, Organization Member entitlements are evaluated. Processor 206a reviews associated privileges and rights to impose related Interaction Space Type distinctions as described earlier. For example, by design, a User operating in a Social Message Session is not allowed to communicate as a Professional in a Professional Interaction Space. By design, in a Professional Interaction Space, only a BIS Owner entitled User is permitted to create Business Interaction Spaces.

In update processor 206b, processes control updates to Message Users as a function of how Users are interrelated per Interaction Space participation and contact relationships illustrated in FIG. 3 and FIG. 4. Processor 206b evaluates semantics of relationship types among Users to determine which Users are entitled to be informed of what events. For example, a User's IS Posting to an IS, is dispatched to the Interaction Space's participants; when a user joins an Organization, the other Users who have that User in their contact list (i.e. they are "watchers"), are informed. When a BIS Owner gives a User Access to a BIS, that User is informed. Updates are dispatched as messages to online (logged-on) Users in real-time. They are also persisted in Message Read Models. This enables updates to be made available to impacted offline Users as when the offline user next logs onto platform 104; the User's Message Client obtains the latest updates via Message Read Model queries.

In archive event processor 206c, processes control Interaction Space archival. Again, distinctions between the various Interaction Space Types are applied. For example, the first time that a User from Organization A joins a Professional IS as a professional, subsequent events for that IS are dispatched to the archive read model for archival by Organization A. Similarly, when the last User from Organization A, participating in a Professional IS as a professional, leaves the IS, archival of subsequent events for that IS by Organization A is terminated.

Network processor 206g has processes to control User authentication via GAS 206e. A User entering platform 104 via a Social Entry Point is authenticated against his Message Account. A User entering platform 104 via a Message Entry Point is authenticated against his Member Account. The first time that a new Organization Member initiates a Professional Message Entry Point call, his Member Account is not yet federated with his Message Account. Processor 206g requires that the User be authenticated (via GAS 206e) a second time, against his personal Message Account. This successful double authentication results in a persisted "same-person" link between the two Accounts, thereby establishing that the two Accounts are now federated. The next time the User launches a Professional Message Session, the User only need be authenticated against his Member Account. This authentication may be via SAML, which gives an Organization control over how its members are authenticated. The persisted federation status ensures that a second authentication against the User's Message Account is only needed for the User's first Professional Message Session launched for a particular Organization. This preserves a feature of Organization Member authentication by SAML, namely, a single sign-on (SSO) experience. Once a User's Accounts have been federated, whenever an Organization Member enters Professional Message with an existing security context, the SAML-based authentication is transparent to the User.

Referring to FIGS. 16 and 8, further detail is now provided on an aspect of service manager 206d. Service manager 206d provides processes relating to long-term management of Member Accounts in platform 104.

An Organization typically maintains a directory of its employees and consultants, contractors or professionals having a role with the organization. A directory account is created when a person joins the Organization. The account is deactivated or deleted when the person leaves. Existing directories include Microsoft Active Directory (trademark), IBM Domino Directory (trademark), and other directory systems based on LDAP or SQL databases.

In service manager 206d, component 301 provides directory synch agent 201 that can be deployed to an Organization's site, shown as Organization 1, 2 and 3. Synch agent 201 provides processes to synchronize identified portions of the Organization's directory information to service manager 206*d*. All accounts created by Directory Synch automatically become Member Accounts linked to their respective Organization(s) as illustrated in FIG. 3. By definition new Member Accounts are not yet federated.

Directory Synch may also detect deleted or deactivated Directory Accounts. Deletion of an account triggers deactivation of any corresponding Member Account. If the Account was federated, the federation is dissolved. A User loses his privileges to access Professional Message on behalf of his former Organization.

Execution of a Directory Synch Agent is optional, and an organization may elect to create and manage its Member Accounts manually as shown by Company Administrator 104 interacting with Service Admin GUI component 202 to provide comparable information for Organization 4.

Service Admin GUI component 202 may be made available to all organizations for use by administrators to provide access their Member accounts of their users.

A private individual may establish and manage his Message Accounts by interacting with service manager 206*d* via Social Message GUI 203.

Figure 17:
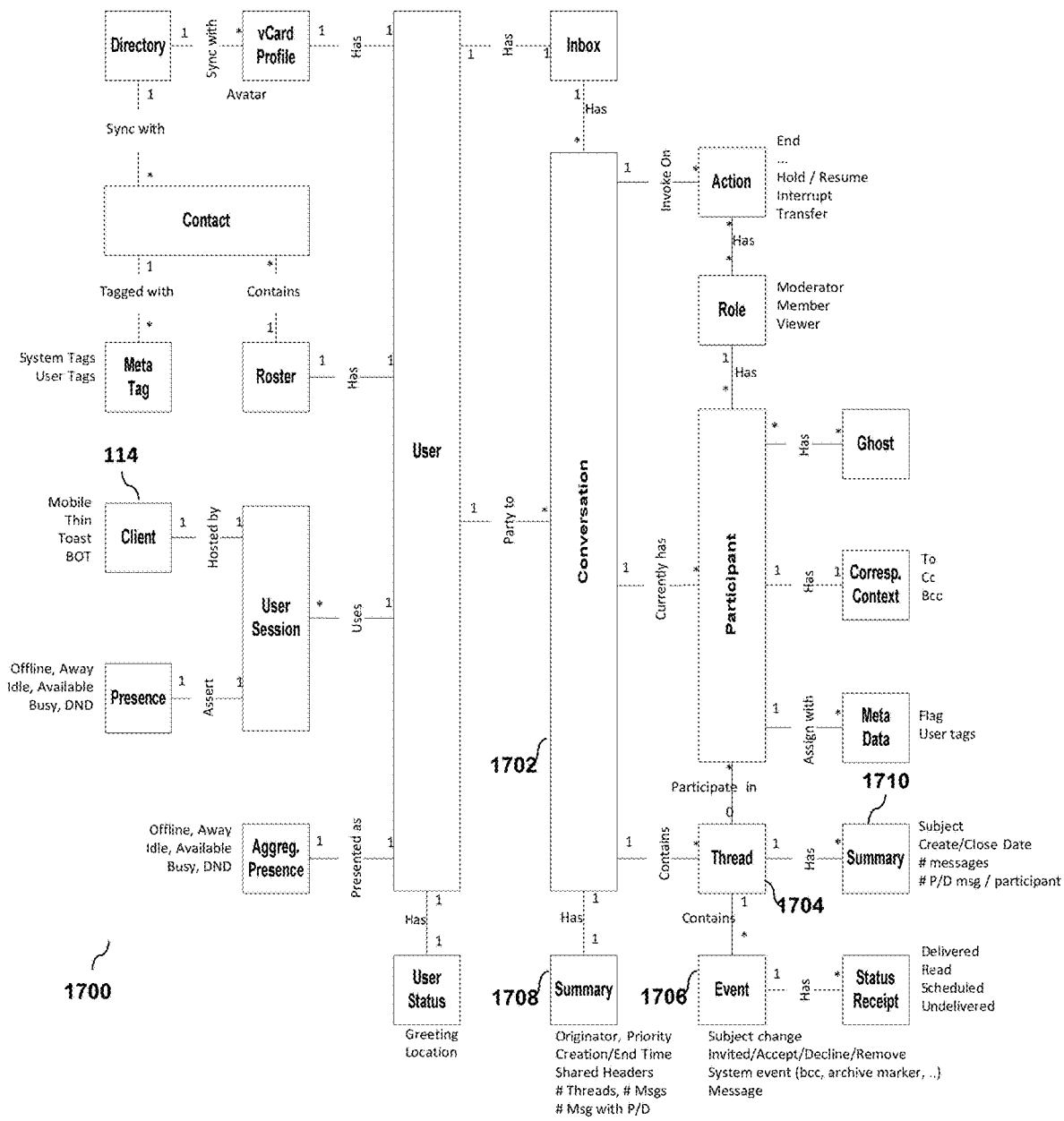
FIG. 17 is a user data model diagram showing exemplary relationships among users, a conversation, threads, and messages according to an embodiment of FIG. 1.

Having described various functional and structural elements of a conversation user data model for messages used in an embodiment are now described. Exemplary components for a conversation are described in U.S. Pat. No. 8,738,715 and US patent publication no. 2014/0310365, the contents of both of which are incorporated herein by reference. However, for an exemplary model, FIG. 17 shows data model 1700 that include a user participates in a conversation 1702, which contains threads 1704, each thread containing a series of messages which may be encapsulated as events 1706. Each conversation 1702 has summary data 1708 that may contain the conversation originator, conversation priority, conversation creation and end date and information, such as the number of threads 1704 and number of messages in the conversation. In one embodiment, a conversation 1702 consists of a series of one or more linked message threads 1704. A thread 1704 is a series of one or more messages sent amongst existing (and added) users, which may share the same subject for the messages. A thread may be demarcated by user, by subject changes or other criteria.

Each thread 1704 represents one segment of conversation 1702. A thread has a number of users and summary 1710 containing data elements, such as subject, thread creation and close date and number of messages in the thread. Threads and parts thereof may be archived to database 106.

Each thread 1704 may contain events 1706 relating to the message, such as a subject change, an invitation of additional participants, notification of participants accepting or declining invitation, removal of participants from a conversation, or participants leaving a conversation and messages. For each message, receipts may be generated at various points during creation, transmission, delivery and reading of a message by users. The receipts show a progression of processing of the message from the originating participant/user to platform 104 to the recipient participants/users.

In one embodiment, a conversation for a message 1702 starts with one user with an open message thread 1704 with at least one message. While a thread is open, any number of serialized messages may be added to the thread. If the current thread is closed, and if the conversation has not yet ended, a new message thread 1704 starts on the next message sent into that conversation 1702. If the list of users for that conversation becomes empty (e.g. all users either left the conversation or were removed from it), the thread closes.

Having regard to functional and structural elements of platform 104 and the related data model for a conversation used in an embodiment, details are provided of exemplary UIs generated on a User's device 108 as an exemplary Company Channel is created. A Company Channel is a type of Business IS which, by a configuration setting, is limited to membership by members from a single organization. A Company Channel has a single BIS Owner and that owner determines access to the BIS within that company.

Figure 18A:
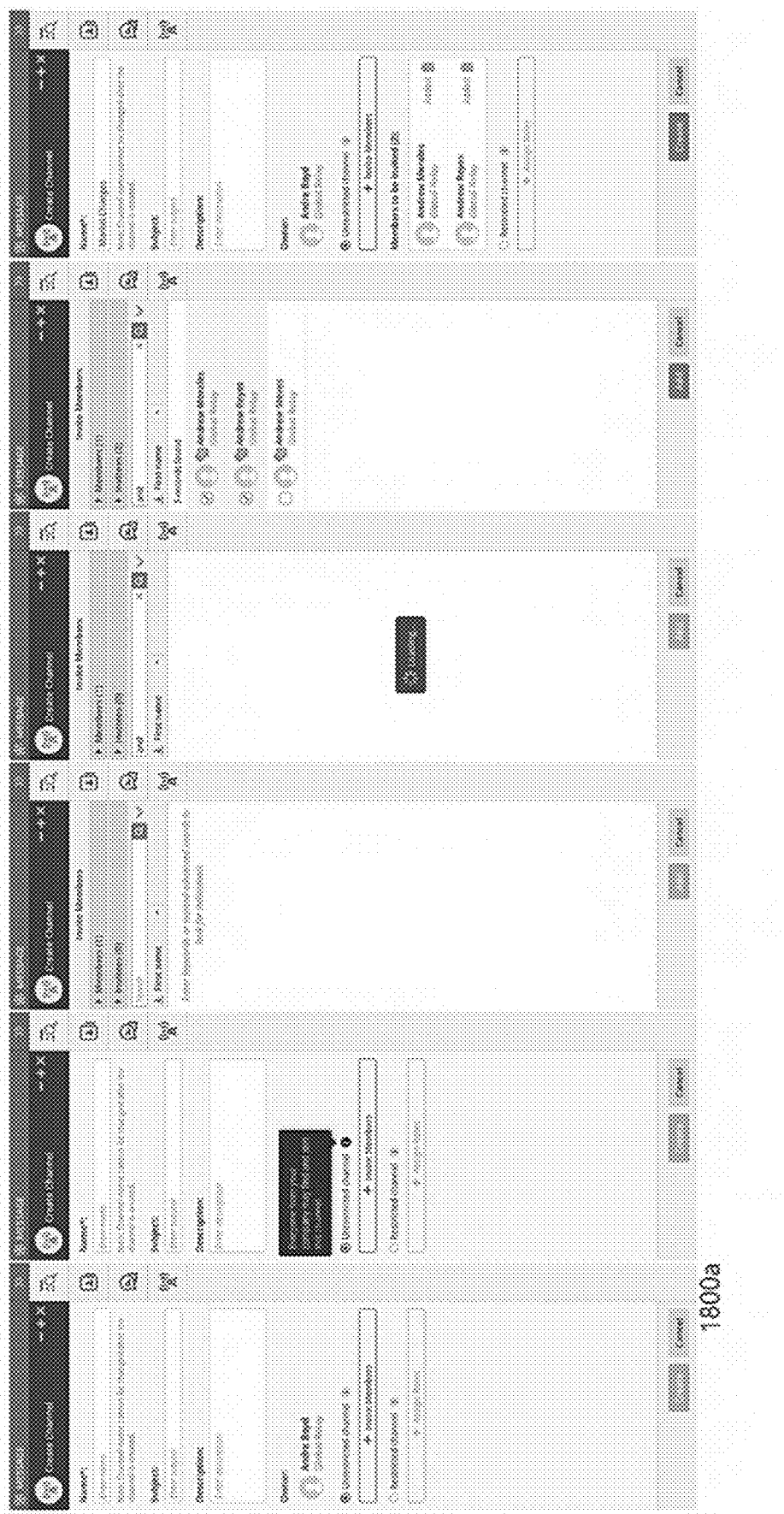
FIG. 18a is a schematic diagram illustrating exemplary user interface screens generated on a user's device when an interaction space is being created by the message platform for an embodiment of FIG. 1.

Referring to FIG. 18*a*, six screens 1800*a* are generated in sequence on device 108 via client 114 and illustrate an exemplary workflow of steps executed to create a company channel using platform 104. In the first screen, the user, who becomes the owner of the channel, initiates creation of a Company Channel. Fields are available to set the channel's Name, Subject, and Description. It is also possible to select between a further subtype of:

"Unrestricted channel", which provides membership to all Message Users within the channel owner's Company; or "Restricted channel", which provides membership that is restricted to a list of specifically identified Message Users within the channel owner's Company.

In the second screen, the owner has hovered over the "Unrestricted channel" help icon, and the application has displayed a pre-set membership policy for this subtype of IS: "Everyone from your company may find and join this channel". In the third screen, the owner selects an optional feature to send "invitations" to particular Organization Members. In the fourth screen the owner enters user search criteria "and" and waits for results to be returned. In the fifth screen, platform 104 has returned a search result set of three records and the owner has selected the first two sets. In the sixth screen, the owner is ready to create the channel and send the invitations to the selected invitees.

Referring to FIG. 18*b*, a workflow for creating a company "Restricted channel" is similar to creating an "Unrestricted channel", except that instead of the fourth and fifth screens of FIG. 18*a*, screens 1800*b* in FIG. 18*b* are generated. For creation of an Unrestricted channel, the chosen users may be provided with non-default role assignments with respect to this IS.

Next, an example of what a User would see on his device 108 as an exemplary Business Channel is created. A Business Channel is a Business Interaction Space with two or more BIS Partners. By design for this example, the creator of the Business Channel has the authority to set the (businesses) organizations that are entitled to join; each designated organization must assign a co-owner within that organization who carries responsibility for determining access to Organization Members within that Organization.

Figure 19:
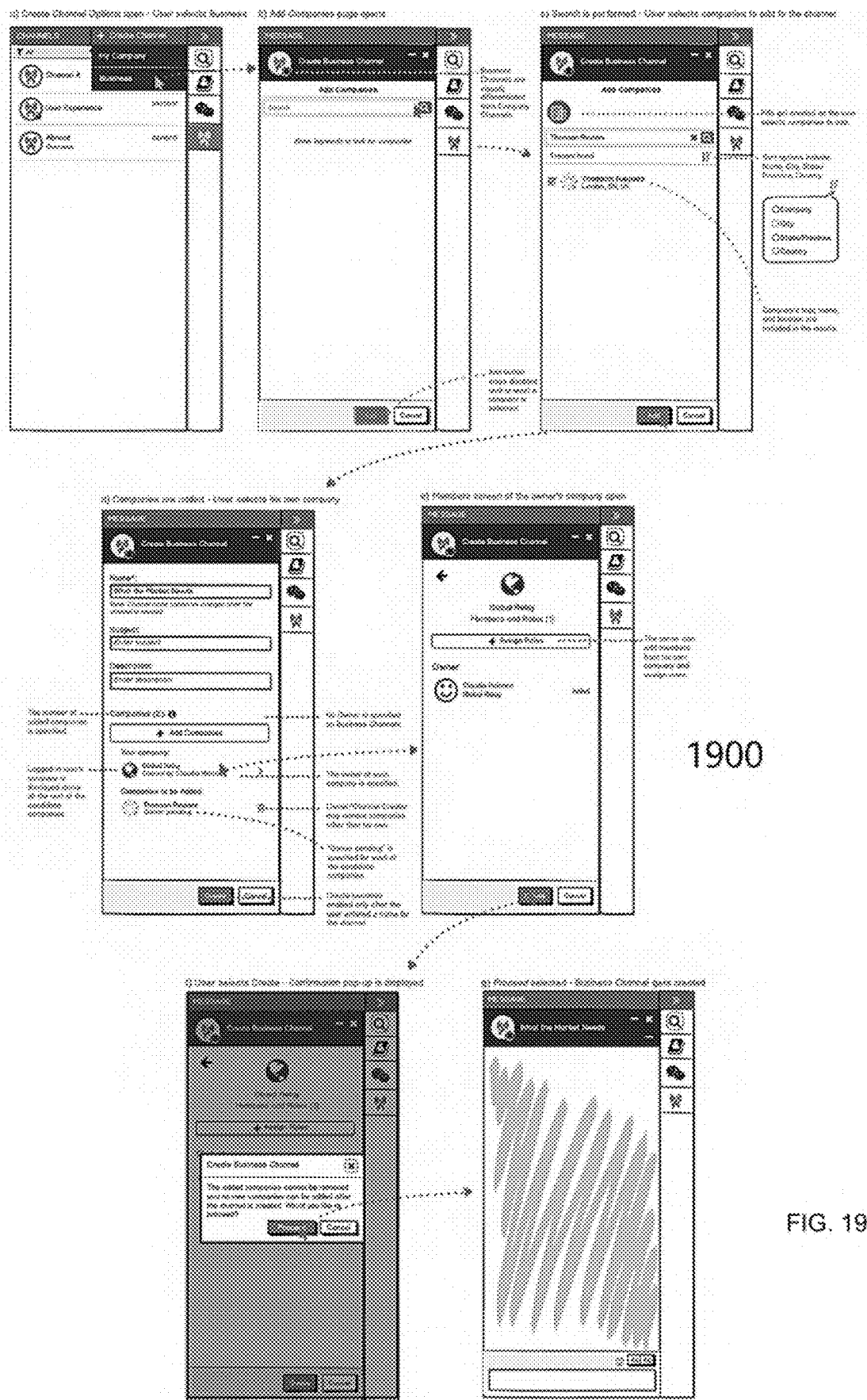
FIG. 19 is a schematic diagram illustrating exemplary user interface screens generated on a user's device when an interaction space is being created by the message platform for an embodiment of FIG. 1.

Referring to FIG. 19, seven screens 1900 are generated in sequence on client 114 on device 108 that illustrate an exemplary workflow of steps when creating a business channel using platform 104. In the first screen, the user, who is the owner of the channel initiates creation of a Business Channel. In the second screen, platform 104 generates a GUI presenting an offer with options to search by keyword(s) for organizations to be added as authorized member organizations. In the third screen, after the owner searched for an organization named "Thomson Reuters", platform 104 has retrieved data from the search results and generates the result set. The channel owner selects that organization for addition. In the fourth screen, the owner has entered additional information about the channel such as the channel's Name, Subject, and Description. The GUI also shows a list of organizations that include the Owner's organization and previously selected organizations. In the fifth screen, platform 104 provides a GUI with an invitation allowing the user to add Organization Members from his Organization as members of the business channel and to assign roles. In the sixth screen, the owner is ready to create the channel. In the seventh screen, the channel has been created.

Figure 20:
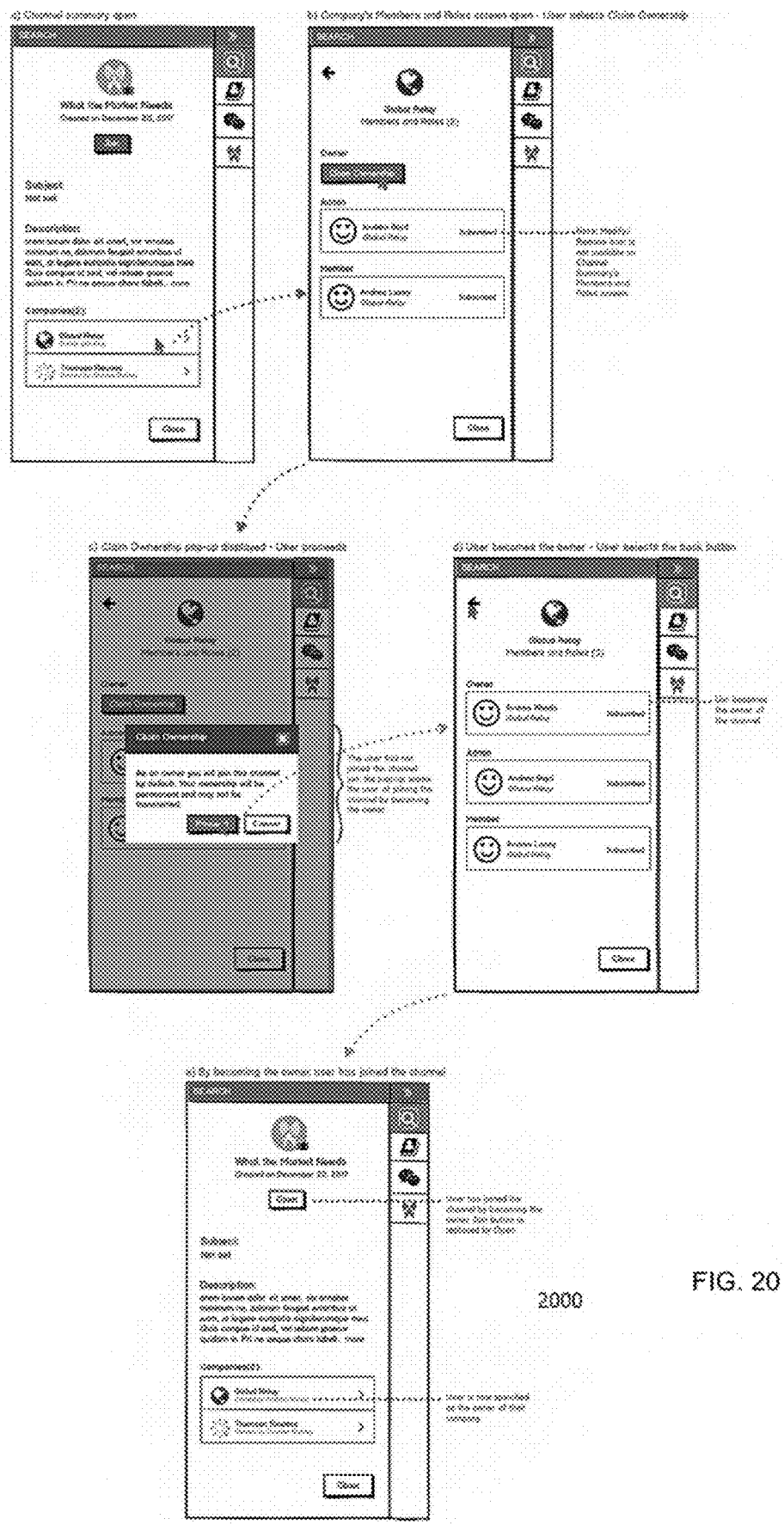
FIG. 20 is a schematic diagram illustrating exemplary user interface screens generated on a user's device when ownership of an interaction space is claimed by the message platform for an embodiment of FIG. 1.

Now referring to FIG. 20, screens 2000 are generated on device 108 by client 114 as an exemplary ownership claim is created for a Business Channel, where an exemplary workflow is described for a BIS Owner Entitled Organization Member in a counterparty organization of a business channel claiming co-ownership of a business channel for his organization.

For this example, the following constructs and privileges are in place by definition. A BIS Owner Entitled User may make a Business Channel ownership claim for his organization. For the related screens, a "Claim Ownership" button is accessed from the Owner section on a Company's Members and Roles screen. The button is not visible to a user who does not have a BIS Owner Entitlement. In such a case, the Owner section is not visible to the user, unless there already is an owner. Screens 2000 illustrate an exemplary workflow when a User is claiming ownership of a business channel in platform 104. In the first screen, the BIS Owner Entitled User has located an Un-Owned Business Channel and the results are shown. The previous Channel Search screen has not been shown. In the screen, in the Business Channel description's list of companies the "Global Relay" company is listed with the added notation of "Owner Pending". In the second screen, client 114 on device 108 generates an offer to "Claim Ownership". In the third screen, the GUI displays a pop-up notification indicating the consequences and responsibilities of "Claim Owner" function. In the fourth screen, the display shows that the user has been granted the "owner" role for the business channel for his organization. In the fifth screen, platform 104 displays the business channel's summary information. Note in the Business Channel description's list of organizations the example "Global Relay" organization is listed with the added notation of "Owned by <user name>".

Now, referring to FIGS. 21-26, several exemplary User Interfaces (UIs) that are generated on various devices 108 are shown and described. These UIs are generated during selection of an IS by a user and conversation streams between the user sending the message from a first device 108 and a second user receiving the message on a second device 108. It will be appreciated that processes relating to operation and management of spaces, accounts, privileges, Calling Cards and other features as described herein that underlie data and information shown for spaces and accounts shown in FIGS. 21-26 are generated by appropriate processes and functions described for embodiments.

One UI paradigm is use of an message "inbox" user interface to manage messages processed on device 108, having graphical features and information similar to electronic text message conversations. An inbox user interface may show active conversations for a user. There may be provided graphical/text indications of the number of active conversations and the number of conversations with unread messages. The inbox may also present active conversations and conversation invitations with filtered views. Any conversation in the Inbox may be marked with tags, such as a favorite. The inbox may also show indications as to selected statuses or characteristics of the message or any users.

Figure 21:
FIG. 21 is a schematic diagram illustrating an exemplary user interface screen generated on a user's device showing a selection of interaction spaces used by the message platform for an embodiment of FIG. 1.

In FIG. 21, different types of icons are created in UI 2100 on user's device 108 that is about to initiate a message conversation through an embodiment are shown. UI 2100 shows several of types of available ISes in a header of UI 2100, using multiple icons and metadata descriptions as shown. For example in a one-to-one conversation space, an avatar image of a counterparty is shown along with the "firstname" and "lastname" of the participant and most recent subject of the conversation (if set). In a multi-party conversation space, an icon with three stylized participants is shown in upper left corner along with a subject of the conversation and a list of participants. In company channels of different types a unique stylized icon is shown along with the channel name and channel subject. For a selected space, features and restrictions for messages generated in that space are governed by the underlying previously defined attributes and constructs for that space. Those attributes and constructs are typically not displayed in a conversation. For one embodiment, it is presumed that a user selecting a given space is familiar with these attributes and constructs. However, an embodiment may generate and display selected information regarding these attributes and constructs to a UI (e.g. in a pop-up window) or by clicking on attributes, icons and symbols shown in the UI to navigate to related information.

Figure 22:
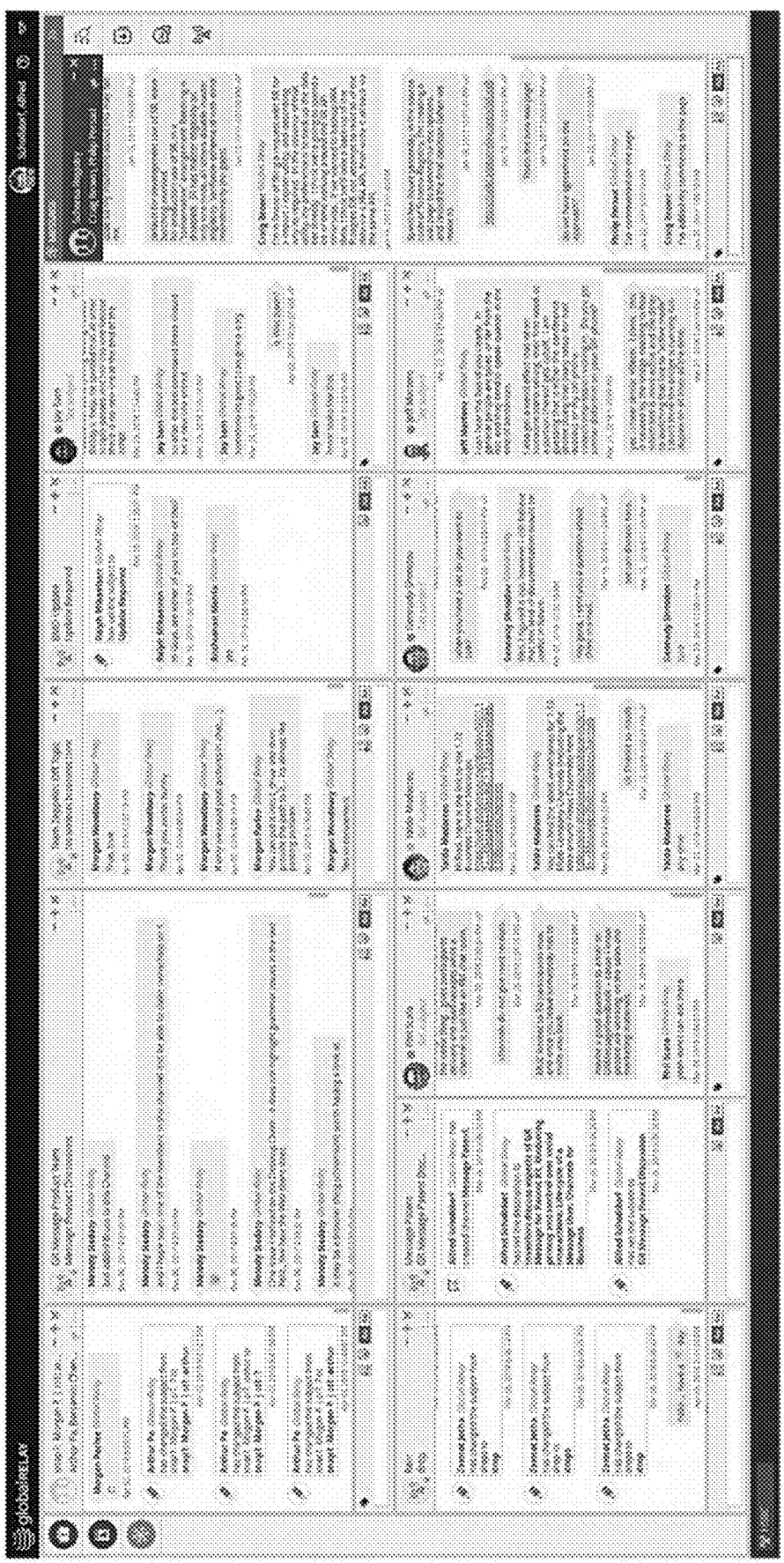
FIG. 22 is a schematic diagram illustrating an exemplary user interface screen of layout of several interaction spaces used by the message platform for an embodiment of FIG. 1.

Referring to FIG. 22, UI 2200 is generated showing a layout of several Interaction Spaces. Each rectangular block shows contents of an IS and provides sections for header, body content and an editor area for new messages being composed. Displayed element of an IS may be arranged in a grid layout creating a tiled appearance (as shown below) or may be arranged as free-floating, overlapping windows.

Figure 23:
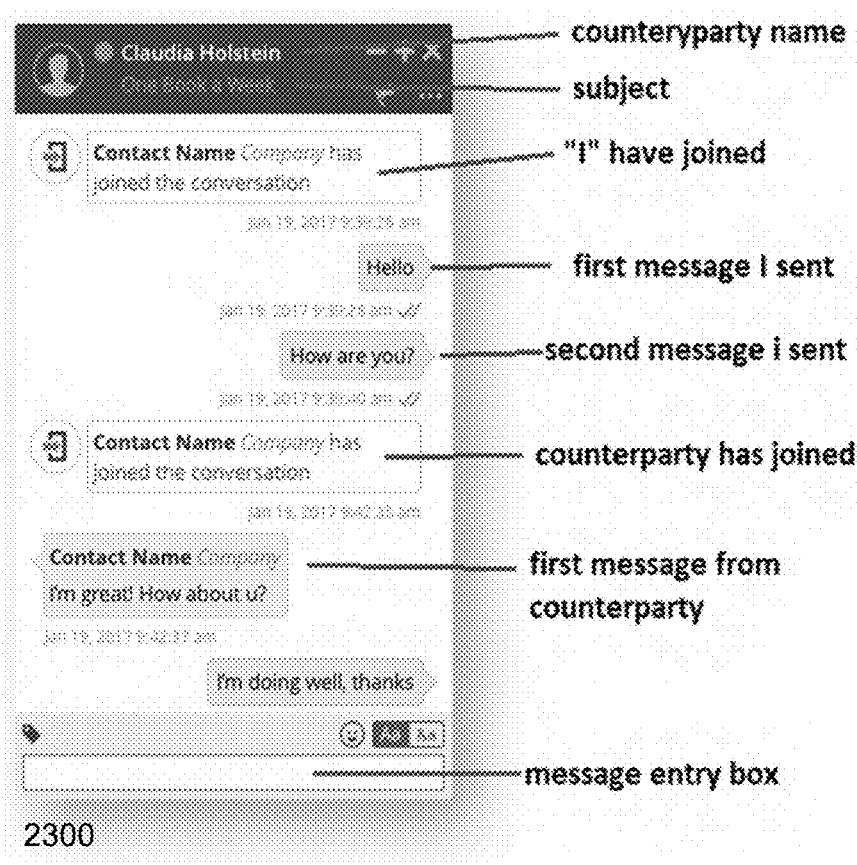
FIG. 23 is a schematic diagram illustrating an exemplary user interface screen of a conversation in progress on a device as processed by the message platform for an embodiment of FIG. 1.

Referring to FIG. 23, UI 2300 is generated showing a snapshot of a private (one-to-one) conversation in progress between a user of device 108 and another user with another device 108.

Figure 24:
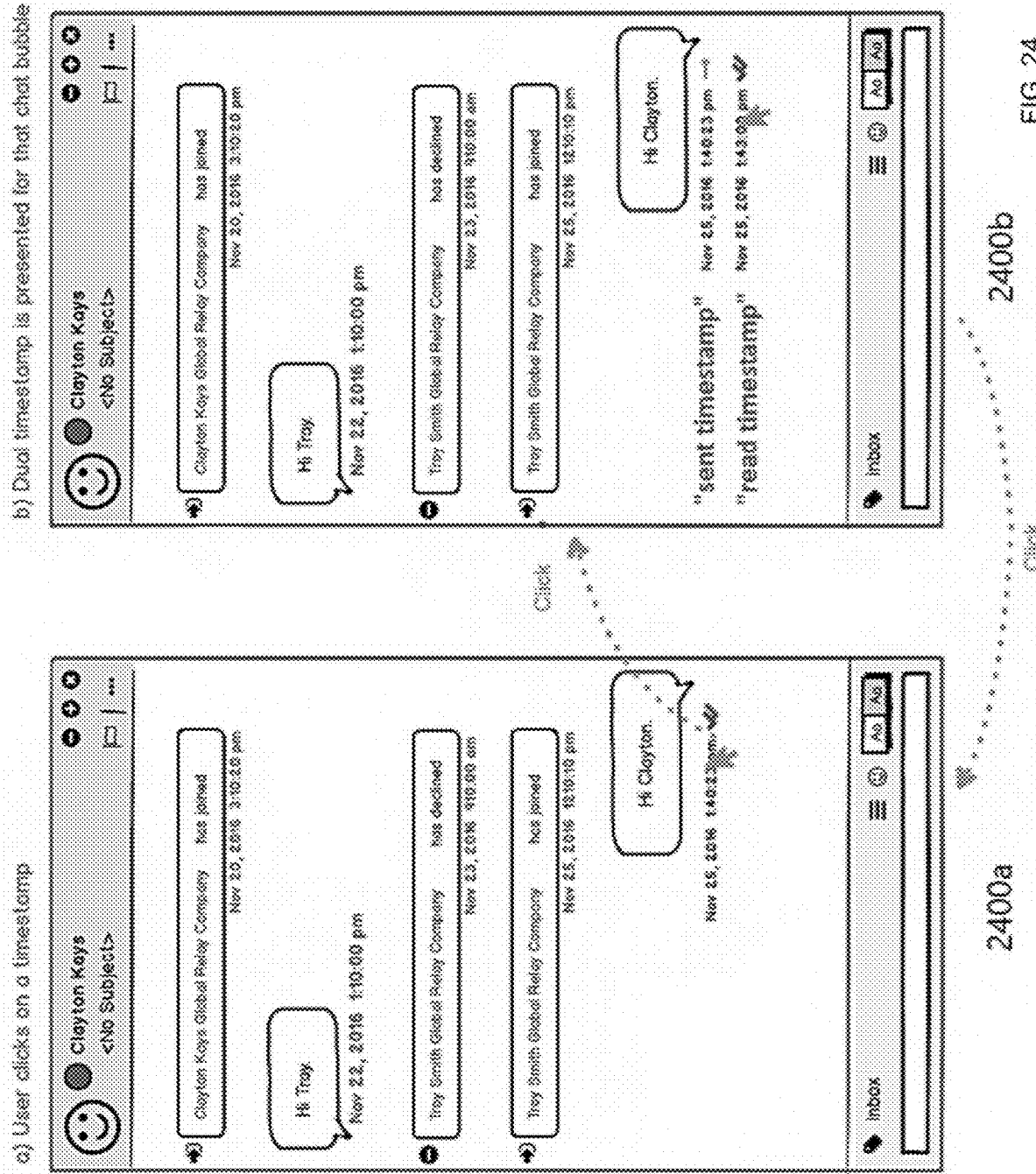
FIG. 24 is a schematic diagram illustrating exemplary user interface screens of a conversation in progress on a device as processed by the message platform for an embodiment of FIG. 1.

Referring to FIG. 24, UIs 2400a and 2400b are sequentially generated showing additional data may be shown such as the sent timestamp and the read timestamps (the time at which the other participant of the conversation "read" the message). This optional data may be hidden or displayed by clicking, touching or otherwise activating a graphic element with the corresponding human-interaction device(s).

Figure 25:
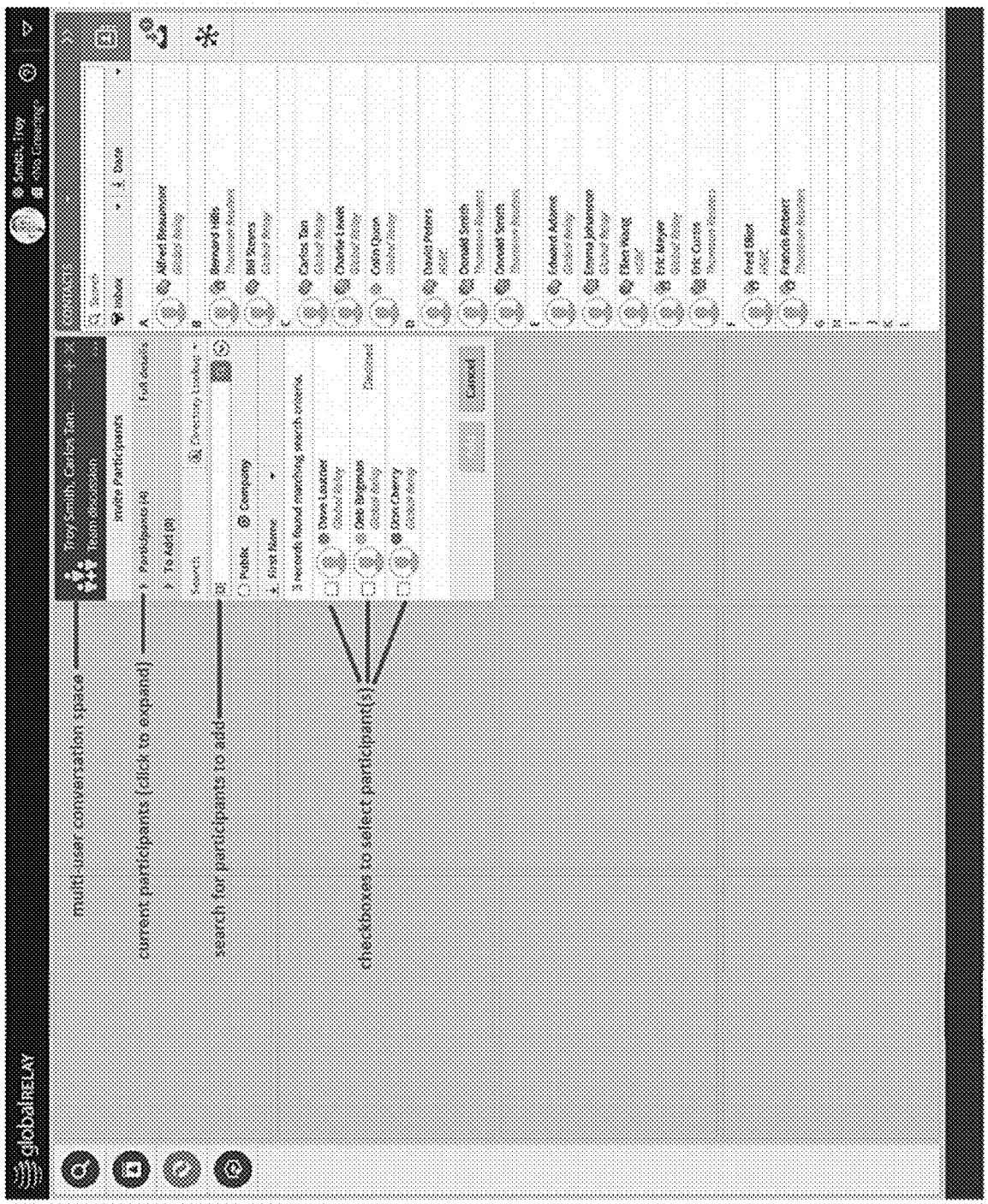
FIG. 25 is a schematic diagram illustrating an exemplary user interface screen of a multi-party conversation in progress on a device as processed by the message platform for an embodiment of FIG. 1.

Referring to FIG. 25, UI 2500 shows a multi-user conversation space in progress and illustrates execution of additional controls to add and remove participants from the space, as shown.

Figure 26:
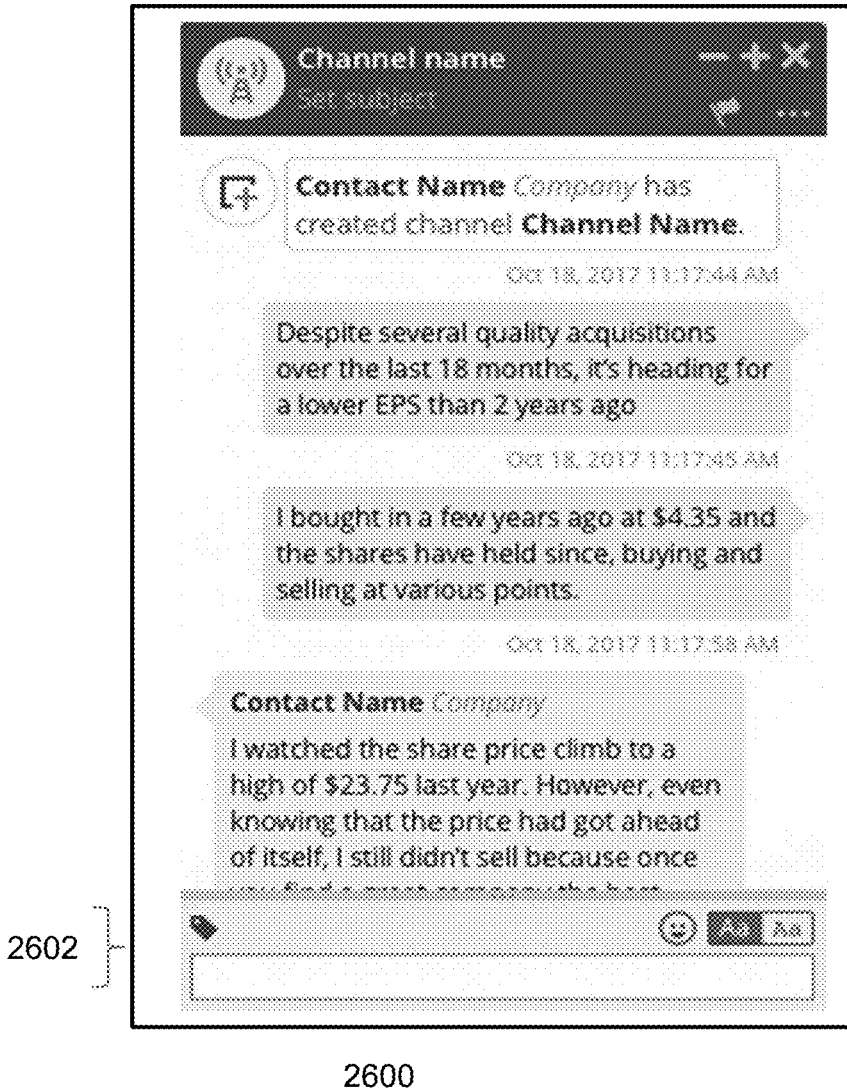
FIG. 26 is a schematic diagram illustrating an exemplary user interface screen of a conversation in progress with a calling card credentials presented for an account on a device as processed by the message platform for an embodiment of FIG. 1.

Referring to FIG. 26, in a BIS context it is often helpful to identify not only the name of an individual with his messages, but also to identify the company and other relevant details about the counterparty. As noted earlier, an embodiment's Calling Card construct provides this facility. UI 2600 shows a stream of messages where data from a pop up Calling Card 2602 associated with a user (such as contact name, company name, phone number, and other details) are selectively displayed (here the contents are empty).

Having regard to the above description of functions, structures and examples of execution of various processes for platform 104, database 106 and client 114, it will be appreciated that platform 104 enables mediation of multiple points of control corresponding to multiple different Accounts for a person. The described embodiment relates to two control points, although other embodiments may have more than two.

A first control point is via management and use of a Message Account. The Message Account is controlled by a User and provides the identity used by the Message Platform for messaging. This is akin to providing and showing an email address of a user in a message distributed in an email platform. The information associated with a message Account represents personal information—e.g. personal profile attributes as well as a user's list of contacts. This information is persistent and long-lasting; it is not affected when the User leaves a particular Organization.

A second control point is via management and use of a Member Account associated with an Organization. Rights, privileges and archiving parameters for a Member Account is set and controlled by the Organization. The Member Account provides an identity used for managing an Organization Member's access to Enterprise Applications subscribed to by the Organization. For example, an Organization may subscribe to an enterprise application supporting compliance monitoring of archived messages. It will be appreciated that messaging is an exemplary enterprise application that can be provided to an Organization Member through his Member Account. The information associated with a Member Account represents contextualized information about the User as an Organization Member (for example, organization member profile attributes and entitlements). Member Account information is linked to a person's status in the Organization; it disappears when the person leaves the Organization.

A single person may have both a Message Account and a Member Account representing his role as a Message User and as an Organization Member, respectively. As a Message User, a person can initiate a Social Message Session and authenticate against his Message Account identity. In an embodiment, a User's messaging entitlements and capabilities may be defined by verification and linkage of his identity against a personally managed account rather than an account controlled by his associated organization. Meanwhile, a Professional Message Session operates behalf of an Organization and typically requires verification of the user's identity against an organization-managed member account. A person cannot initiate a Professional Message Session on behalf of the Organization until it is established that his Member Account is for the same person that already has an established Message Account identity. It will be seen that Account Federation by an embodiment establishes that both Accounts are for the same person. A person that can demonstrate that he is able to be authenticated against both accounts will enable an embodiment to link the two accounts together, thereby "federating" the two accounts. The person may now be referred to as a message user: a user that is entitled to initiate either a Social Message Session or Professional Message Session on behalf of the organization. A Professional Message Session authenticates a user against his Member Account and treats the two linked accounts as one. Therein, account profile attributes are aggregated into a single user profile; member account entitlements govern the extent that a user may leverage messaging features on behalf of the organization. This aggregated identity enables a user to participate in different Spaces as either an individual or as an entitled member of an organization. As such, the message platform acts as both a social media platform as well as an enterprise application.

Account Federation is established the first time that a User attempts to use Message on behalf of the Organization. The federation is dismantled when the User leaves that Organization. This provides an authoritative representation of who is empowered to communicate on behalf of an Organization and who is not. It is authoritative in the sense that both parties to the trust relationship must be in agreement. Accordingly, organizations must establish active Member Accounts and provide Calling Cards. A User needs to federate his long-lasting messaging identity with his more ephemeral identity as an organization member. Only then is the trust relationship fully established.

The embodiments provides flexibility in how Interaction Space Types can be designed to identify and manage control and access privileges between Users and Organizations. In Private Interaction Spaces, control resides with individuals. When a User communicates on behalf of his Organization, control inherently shifts to the Organization. For Professional Interaction Spaces, a User makes decisions as to whom to invite, and whether to join. However, the Organization retain control over IS archival and regulatory compliance review. With Business Interaction Spaces, control resides fully with partner Organizations. BIS Partners control not only IS archival, but which members can join. The relationship between BIS Partners reflects a natural peer-to-peer relationship of Organizations in the "real" world.

The above-noted three Space types support transitions of private communications to professional communications to business communications. This represents a continuum ranging from Interaction Spaces that emphasize end-user flexibility on the one hand, to Business Interaction Spaces emphasizing organization-centered structure and control on the other. Users may communicate as individuals in order to find Organizations to join. An organization may subsequently provide privileges to its members to participate in Interaction Spaces as professionals. Professional Interaction Space communications may foster business decisions to establish business partnerships, which may be represented as structured Business Interaction Spaces. In these transitions, simple bootstrapping steps enable Users to move from one context to the other.

In another aspect, an embodiment provides facilities for processing and linking two or more Organizations to an account for an individual. The Message Platform States may be augmented to permit additional possibilities, such as:

Linking a User to more than one Organization Member via the "same-person" relationship as shown in FIG. 3; and Permitting an IS Participant of a Professional Interaction Space to act on behalf of one of the Organizations to which he is a member. The identification of the selected Organization being represented may be stored with the IS Participant entity as illustrated in FIG. 4, illustrating a specific context under which the User was invited into (and joined) a Professional Interaction Space.

A User may be limited to representing only one Organization in an Interaction Space. Message Platform workflow may be modified so that:

A User is visible in the Message Directory to other Users as having zero, one or more Organization memberships;

An invitation to join a Professional Interaction Spaces as a professional is subject to membership with a particular Organization;

Any of a User's Member Accounts may federated with the User's Message Account. A User participates in an Interaction Space on behalf of a particular Organization by initiating a Professional Message Session for that Organization; and/or When a User leaves an Organization, he loses access to Interaction Spaces where participation was subject to membership in the Organization that the User is leaving. Professional participation in Interaction Spaces on behalf of the User's other Organizations are unaffected.

Features of an embodiment facilitate a User to communicate with other individuals as an individual through creation and use of a Message Account.

Features of an embodiment facilitate an Organization to control and grant access and communication privileges to a User to interact with others on behalf of the Organization through creation and design of a Member Account for the User and a Calling Card. The first time the User launches Professional Message, his Accounts are federated and the User's Calling Card status is visible to the community at large. The User may then participate as a Professional IS Participant in Professional Interaction Spaces. These communications may encourage partnership-level business decisions. A User may invite a suitably privileged User into the Interaction Space, or solicit the entitlement for themselves.

Features of an embodiment facilitate an Organization to control and grant access for a restricted number of Users to make partnership level business decisions through creation and design of BIS Owner Entitlements to designated Users. Such Users may then establish and manage Business Interaction Spaces on behalf of the Organization. The real control of Business Interaction Spaces resides with Organizations rather than individuals. While an existing or original participant may leave an Organization, in an embodiment, others in the Organization may be entitled to simply step in and take that place.

Features of an embodiment facilitate a User with a both a personal message account and a member account provided by an organization, to federate these accounts thereby allowing them to act as a single enterprise application account for the duration of a User's membership with an Organization. This provides a user with an up-to-date, contextualized identity visible to the community at large. It promotes growth of communities found in social media while allowing for enterprise-level control by an Organization relating to regulatory, legal or compliance requirements.

The various features described above may be implemented in, and fully automated by processes executed by general-purpose computing devices, including but not limited to data center servers, PCs, tablets, laptops and mobile phones. The processes may be stored in any type or types of computer storage device or memory. It should be understood that the various steps may alternatively be implemented in-whole or in-part within specially designed hardware.

It will be appreciated that all processes, servers, managers, agents, and modules described herein for platform 104, database 106, client applications 114 on devices 108 and other sessions, processes, steps or functions in embodiments may be implemented using known programming techniques, languages and algorithms, such as Java, C++, and others. Although the processes, services and modules described are implemented in applications 114 on devices 108 and in platform 104, it will be appreciated that some functions of the processes may be provided in a separate server that is in communication with devices 108 and/or platform 104. The titles of processes and platforms are provided as a convenience to provide labels and assign functions to certain processes. It is not required that a process perform only its functions as described above. As such, specific functionalities for each application or process may be moved between processes or separated into different processes. Processes may be contained within other processes. Different signaling techniques may be used to communicate information between applications using known programming techniques. Known data storage, access and update algorithms allow data to be shared between applications. It will further be appreciated that other applications and systems on platform 104 and device 108 may be executing concurrently with other processes. As such, any of modules (or parts thereof) may be structured to operate in as a "background" application on device 108 and platform 104, respectively, using programming techniques known in the art.

It will be appreciated that the embodiments relating to clients, servers, services, state machines and systems may be implemented in a combination of electronic hardware, firmware and software. The firmware and software may be implemented as a series of processes, applications and/or modules that provide the functionalities described herein. The algorithms and processes described herein may be executed in different order(s). Interrupt routines may be used. Data may be stored in volatile and non-volatile devices described herein and may be updated by the hardware, firmware and/or software.

As used herein, the wording "and/or" is intended to represent an inclusive-or. That is, "X and/or Y" is intended to mean X or Y or both.

In this disclosure, where a threshold or measured value is provided as an approximate value (for example, when the threshold is qualified with the word "about"), a range of values will be understood to be valid for that value. For example, for a threshold stated as an approximate value, a range of about 25% larger and 25% smaller than the stated value may be used. Thresholds, values, measurements and dimensions of features are illustrative of embodiments and are not limiting unless noted. Further, as an example, a "sufficient" match with a given threshold may be a value that is within the provided threshold, having regard to the approximate value applicable to the threshold and the understood range of values (over and under) that may be applied for that threshold.

Although this disclosure has been described in terms of certain embodiments and applications, other embodiments and applications that are apparent to those of ordinary skill in the art, including embodiments which do not provide all of the features and advantages set forth herein, are also within the scope of this disclosure. Accordingly, the scope of the present disclosure is intended to be defined only by reference to the following claims.

The invention claimed is:

1. A method for managing electronic messaging accounts for an organization having a regulatory requirement to retain business-related electronic messages, the method comprising executing instructions on a processor at a server that:
   for a first user account for a first user associated to the organization, define a message space accessible through electronic devices in communication with the server, the message space accommodating decentralized, peer-to-peer administration by users in the organization, the message space providing facilities for
      identifying an owner for the message space;
      assigning owner privileges for the owner;
      selectively identifying the first user account as the owner for the message space;
      retaining and preserving messages in a manner compliant with regulations governing the organization; and
      creating a message channel in the message space for messages between users in the organization and users in a second organization,
   wherein
      the owner privileges follow an organization policy for the organization and provide the first user with additional privileges in managing the message space reflecting the organization policy.

2. The method for managing electronic messaging accounts as claimed in claim 1, the method further comprising executing instructions on the processor that:

store data relating to the message space, the owner and the owner privileges in a memory storage device accessible by the processor.

3. The method for managing electronic messaging accounts as claimed in claim 2, the method further comprising executing instructions on the processor that:
if the owner has not been assigned to a message channel in the message space, upon receiving a request from the first user to be recognized as the owner, identify the first user to be the owner if no other user has submitted an earlier active request to be recognized as the owner.

4. The method for managing electronic messaging accounts as claimed in claim 3, the method further comprising executing instructions on the processor that:
identify when the first user has vacated as being the owner of the message channel; and
upon receiving a request from the second user to be recognized as the owner, assign the owner privileges to the second user if
the second user has an appropriate entitlement setting its privileges, and
no other user has submitted an earlier active request to be recognized as the owner.

5. The method for managing electronic messaging accounts as claimed in claim 4, the method further comprising executing instructions on the processor that:
process database search requests for owners assigned to the message channel.

6. The method for managing electronic messaging accounts as claimed in claim 4, the method further comprising executing instructions on the processor that:
send a notification message to the second user when there is no owner assigned to the message channel.

7. The method for managing electronic messaging accounts as claimed in claim 1, wherein a second message space is associated with the organization and an entity in a second organization, the method further comprising executing instructions on the processor at the server that:
provide access to a message channel in the message space for messages between users in
the organization and users in a second organization,
wherein
the second message space is accessible through an electronic device;
the second message space provides electronic conversations regulated on a decentralized, peer-to-peer basis between the first user and the entity;
the second message space has a second set of access privileges following a second organization policy for the second organization.

8. The method for managing electronic messaging accounts as claimed in claim 7, wherein:
entitlement to use the second message space by the first user is established by the organization; and
use of the second message space by the first user indicates that communications from the first user have been authorized on behalf the organization.

9. The method for managing electronic messaging accounts as claimed in claim 8, the method further comprising executing instructions on the processor that:
process inputs accepted through a user interface to control and grant entitlements to the first user enabling the first user to make decisions for the message space for the organization.

10. The method for managing electronic messaging accounts as claimed in claim 1, the method further comprising executing instructions on the processor that:
manage data relating to a message directory providing a searchable database comprising the organization and first user.

11. The method for managing electronic messaging accounts as claimed in claim 1, wherein:
the owner privileges enable the owner to grant access privileges to users in the organization.

12. A server for managing electronic messaging accounts associated with an organization having a regulatory requirement to retain business-related electronic messages, the server comprising:
a memory storage device;
a communication link to an electronic device; and
a processor executing instructions from the memory storage device that:
for a first user account for a first user associated the organization, define a message space accessible through electronic devices, the message space accommodating decentralized, peer-to-peer administration by users in the organization, the message space providing facilities for
identifying an owner for the message space;
assigning owner privileges for the owner;
selectively identifying the first user account as the owner for the message space;
retaining messages in a manner compliant with financial regulations governing the organization; and
creating a message channel in the message space for messages between users in the organization and users in a second organization,
wherein
the owner privileges follow an organization policy for the organization and provide the first user with additional privileges in managing the message space reflecting the organization policy.

13. The server as claimed in claim 12, wherein the processor further executes instructions from the memory storage device that:
if the owner has not been assigned to the message space, upon receiving a request from the first user to be recognized as the owner, identify the first user to be the owner if no other user has submitted an earlier active request to be recognized as the owner.

14. The server as claimed in claim 13, wherein the processor further executes instructions from the memory storage device that:
identify when the first user has vacated as being the owner; and
upon receiving a request from the second user to be recognized as the owner, assign the owner privileges to the second user if
the second user has an appropriate entitlement setting its privileges, and
no other user has submitted an earlier active request to be recognized as the owner.

15. The server as claimed in claim 12, wherein the processor further executes instructions from the memory storage device that:
manage data relating to a message directory providing a searchable database comprising the organization and first user,
wherein
entitlement to use the second message space by the first user is established by the organization; and use of the second message space by the first user indicates that communications from the first user have been authorized on behalf the organization.

16. The server as claimed in claim 12, wherein the processor further executes instructions from the memory storage device that:
provide a second message space accessible through the electronic devices, the second message space providing facilities for creating a second message for the first user in a second account for processing by the second message space providing private electronic conversations; and
receive an access request to the message space and if the access request is a first access to the message space,
federate the first account to the second account by aggregating profile attributes of the first and second accounts into a single user profile for the first user, and
record the federation in an account link,
wherein
the first user account has a first set of access privileges associated with the message space;
the second user account has a second set of access privileges associated with the second message space for private messages;
the second set of access privileges are maintained independently to the first set of access privileges;
the second message space provides private messages that are not regulated by the message space; and
federating is established when the first user launches the message space on behalf of the organization to be used for the exchange of messages with a second organization.

17. The server as claimed in claim 16, wherein the processor further executes instructions from the memory storage device that:
deactivate the first user account;
dissolve the account link in the federated account; and
retain contact information in the second user account in the federated account.

18. A method for managing electronic messaging accounts for an organization having a regulatory requirement to retain business-related electronic messages, the method comprising executing instructions on a processor at a server that:
for a first user account for a first user associated to the organization, define a message space accessible through electronic devices in communication with the server, the message space accommodating peer-to-peer administration by users in the organization, the message space providing facilities for identifying an owner for the message space;
assigning owner privileges for the owner;
selectively identifying the first user account as the owner for the message space; and
creating a message channel in the message space for messages between users in the organization and users in a second organization,
provide a second message space accessible through the electronic devices, the second message space providing facilities for creating a second message for the first user in a second account for processing by the second message space providing private electronic conversations; and
receive an access request to the message space and if the access request is a first access to the message space,
federate the first account to the second account by aggregating profile attributes of the first and second accounts into a single user profile for the first user, and
record the federation in an account link,
wherein
the owner privileges follow an organization policy for the organization and provide the first user with additional privileges in managing the message space reflecting the organization policy;
the first user account has a first set of access privileges associated with the message space;
the second user account has a second set of access privileges associated with the second message space for private messages;
the second set of access privileges are maintained independently to the first set of access privileges; and
the second message space provides private messages that are not regulated by the message space.

19. The method for managing electronic messaging accounts as claimed in claim 18, wherein:
federating is established when the first user launches the message space on behalf of the organization to be used for the exchange of messages with a second organization.

20. The method for managing electronic messaging accounts as claimed in claim 19, wherein upon receiving a request to leave the message space, the method further comprises executing instructions on the processor that:
deactivate the first user account;
dissolve the account link in the federated account; and
retain contact information in the second user account in the federated account.

\* \* \* \* \*